US008248471B2

(12) United States Patent
Inui et al.

(10) Patent No.: US 8,248,471 B2
(45) Date of Patent: Aug. 21, 2012

(54) CALIBRATING APPARATUS FOR ON-BOARD CAMERA OF VEHICLE

(75) Inventors: Yoji Inui, Aichi (JP); Mitsuyoshi Saiki, Nagoya (JP); Tsuyoshii Kuboyama, Toyota (JP); Keiichi Nakamura, Toyota (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 315 days.

(21) Appl. No.: 12/728,104

(22) Filed: Mar. 19, 2010

(65) Prior Publication Data

US 2010/0245592 A1 Sep. 30, 2010

(30) Foreign Application Priority Data

Mar. 31, 2009 (JP) ................................ 2009-085478

(51) Int. Cl.
*H04N 7/18* (2006.01)
*H04N 17/00* (2006.01)

(52) U.S. Cl. ............ 348/148; 348/118; 348/187; 701/1; 702/94; 702/150

(58) Field of Classification Search .................. 348/118, 348/148, 187–188
See application file for complete search history.

(56) References Cited

U.S. PATENT DOCUMENTS 6,594,600 B1 * 7/2003 Arnoul et al. .................. 702/94
6,785,404 B1 8/2004 Shimazaki et al.
6,813,371 B2 11/2004 Kakinami
6,915,072 B2 7/2005 Takahashi et al.
6,915,228 B2 * 7/2005 Uffenkamp et al. ........... 702/94
7,218,207 B2 * 5/2007 Iwano .......................... 340/435
7,352,388 B2 * 4/2008 Miwa et al. .................. 348/187
7,756,618 B2 * 7/2010 Mizusawa ...................... 701/36
2008/0007619 A1 * 1/2008 Shima et al. ................. 348/118
2008/0031514 A1 * 2/2008 Kakinami ...................... 382/154
2010/0194886 A1 * 8/2010 Asari et al. ................... 348/148
2010/0245576 A1 * 9/2010 Inui et al. ..................... 348/148
2011/0187816 A1 * 8/2011 Shimizu ......................... 348/36

FOREIGN PATENT DOCUMENTS

JP 4-068995 A 3/1992
JP 8-071972 A 3/1996
JP 2001-187552 A 7/2001
JP 2001-245326 A 9/2001
JP 2004-004006 A 1/2004
JP 2004-144923 A 5/2004
JP 2004-200819 A 7/2004
JP 2005-0077107 A 3/2005
JP 2008-131177 A 6/2008
JP 2008-131250 A 6/2008

* cited by examiner

*Primary Examiner* — Ngoc-Yen Vu
(74) *Attorney, Agent, or Firm* — Sughrue Mion, PLLC

(57) ABSTRACT

Provided is a calibrating apparatus for an on-board camera of a vehicle, which apparatus allows completion of calibration process with a simple additional calibration, even when rejection has issued on the result of automatic calibration. Based upon a camera parameter obtained at the time of completion of adjustment by an automatic adjusting section, a confirmation marker indicating the position of coordinate of a calibration point is displayed in superposition with a camera-captured image. A manual adjusting section adjusts the camera parameter, based on an amount of displacement of the coordinate of the calibration point corresponding to an amount of movement of the confirmation marker moved in response to input of adjustment instruction. In response to input of a determination instruction, a camera parameter setting section sets an undetermined camera parameter at the time of completion of the most recent adjustment by the automatic adjusting section and the manual adjusting section, as the camera parameter.

2 Claims, 10 Drawing Sheets

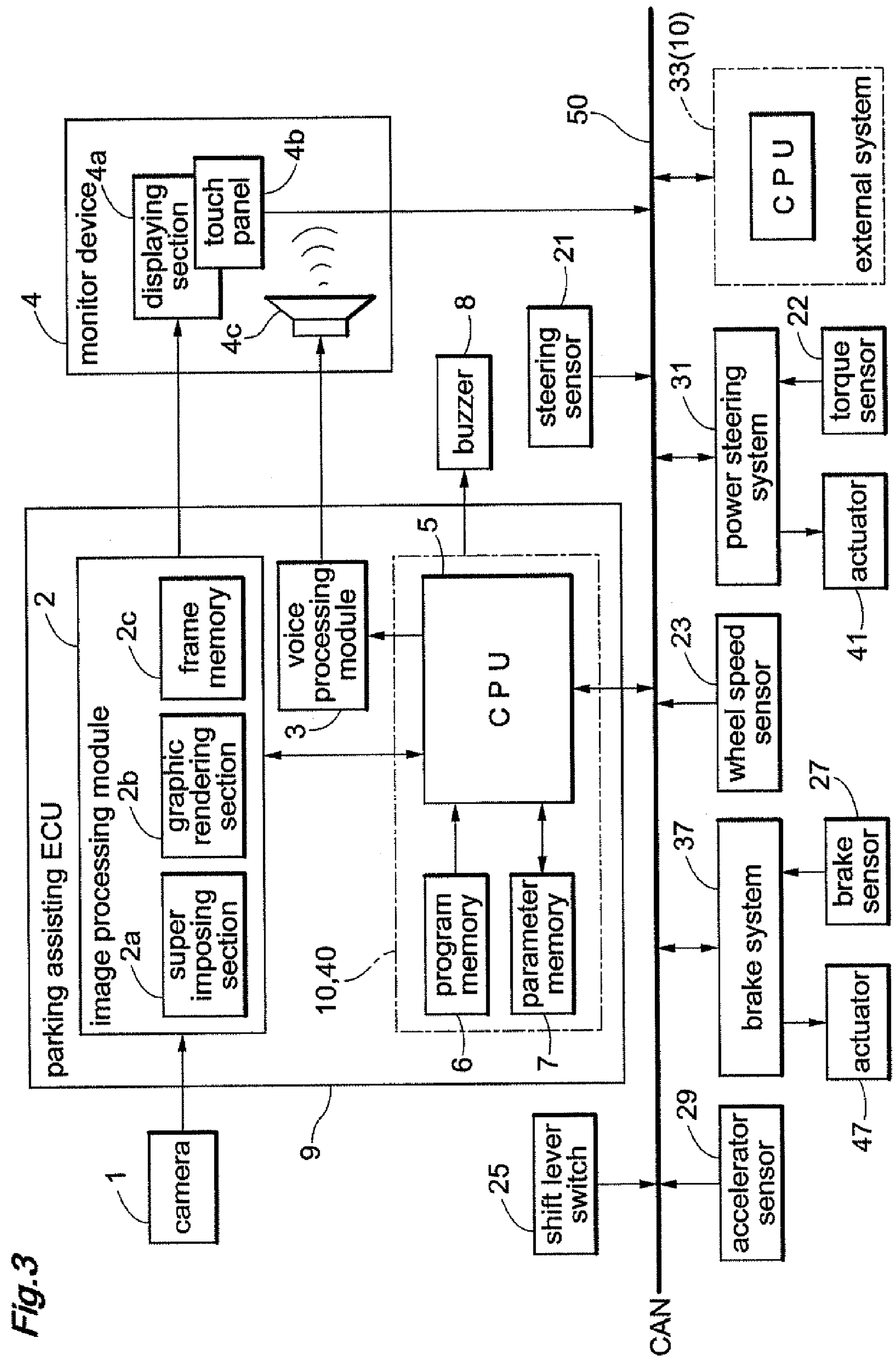
Fig.3
camera
1
9
parking assisting ECU
2
image processing module
2a
super imposing section
2b
graphic rendering section
2c
frame memory
3
voice processing module
5
C P U
10,40
6
program memory
7
parameter memory
4
monitor device
4a
displaying section
4b
touch panel
4c
8
buzzer
steering sensor
21
shift lever switch
25
accelerator sensor
29
CAN
50
33(10)
C P U
external system
31
power steering system
22
torque sensor
actuator
41
23
wheel speed sensor
37
brake system
27
brake sensor
actuator
47

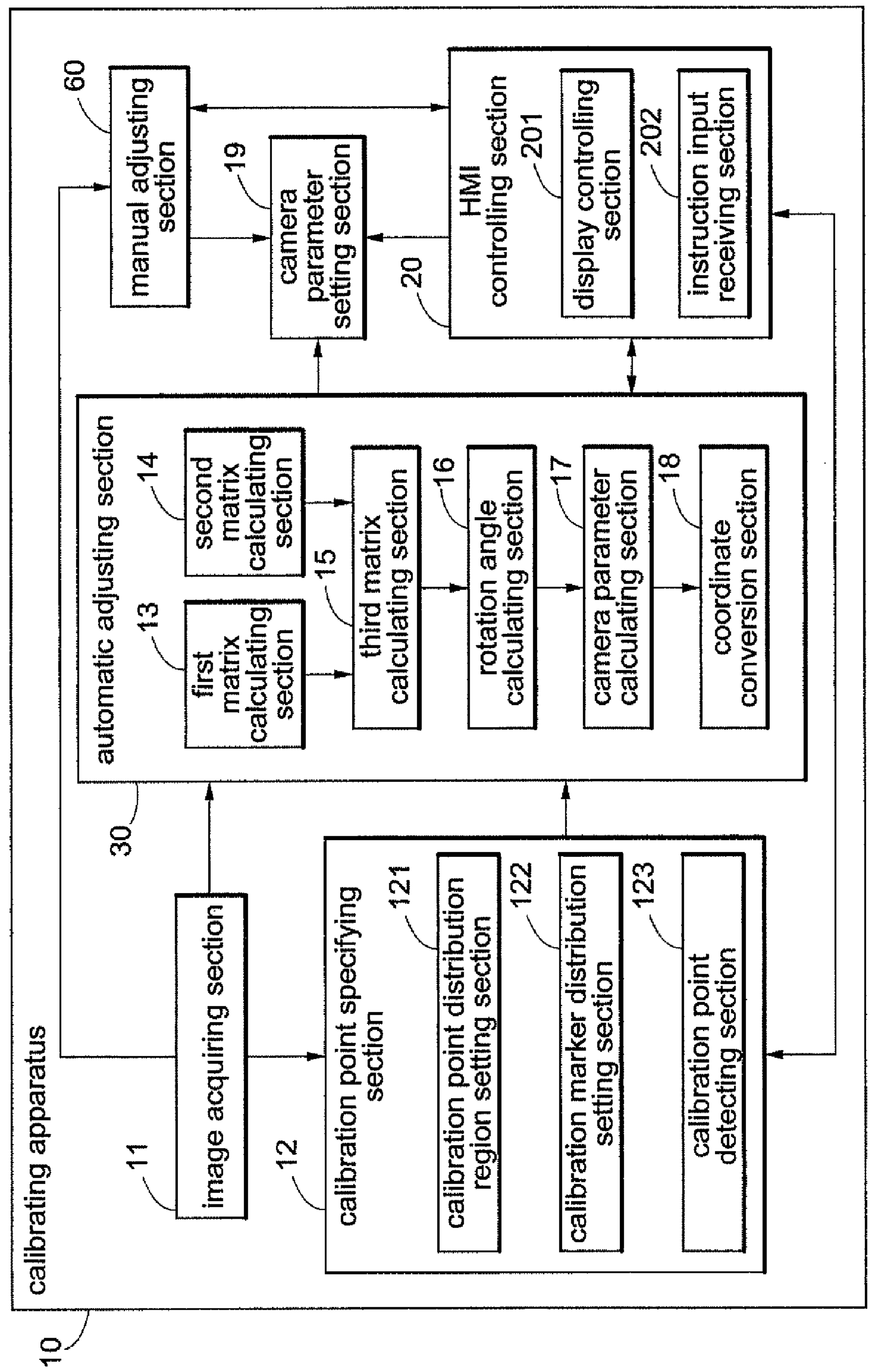
Fig.6
10
calibrating apparatus
11
image acquiring section
12
calibration point specifying section
121
calibration point distribution region setting section
122
calibration marker distribution setting section
123
calibration point detecting section
30
automatic adjusting section
13
first matrix calculating section
14
second matrix calculating section
15
third matrix calculating section
16
rotation angle calculating section
17
camera parameter calculating section
18
coordinate conversion section
60
manual adjusting section
19
camera parameter setting section
20
HMI controlling section
201
display controlling section
202
instruction input receiving section

CALIBRATING APPARATUS FOR ON-BOARD CAMERA OF VEHICLE

CROSS REFERENCE TO RELATED APPLICATION

This application is based on and claims priority under 35 U.S.C. section 119 to Japanese Patent Application No. 2009-085478, filed on Mar. 31, 2009, the entire content of which is incorporated herein by reference.

FIELD OF THE INVENTION

The present invention relates to a calibrating apparatus for an on-board camera of a vehicle, configured to adjust an error, if any, in the posture of the on-board camera when mounted on the vehicle.

BACKGROUND

Recently, for the purpose of supplementing a driver's vision and/or providing information for use in image processing for driving assistance, an on-board camera is often mounted on a vehicle for capturing an image around the vehicle. If the image captured by the camera is to be utilized e.g. for a parking assisting apparatus, it is needed that the coordinate system of the captured image and the coordinate system of the image used in the image processing match with high precision each other. As a matter of fact, the designed ideal correlation therebetween can hardly be obtained due to error or tolerance in the manufacturing precision of the camera per se and/or in the mounting precision of the camera. Accordingly, according to the convention, calibration of the camera is done during the production process of the camera, so as to achieve matching between the two coordinate systems.

U.S. Pat. No. 6,813,371 B (Patent Document 1) and JP2005-77107 A (Patent Document 2) disclose a technique for effecting such calibration of the camera during the production process of the vehicle. According to the technique disclosed by these documents, the calibration of the camera is done by causing a calibration marker captured by the camera to agree with an adjustment frame displayed in superposition with a captured image, under a predetermined criterion. As the adjustment frame, there are provided three kinds, in correspondence with pan, tilt and roll in the three-dimensional, Cartesian coordinate system. In operation, a worker will operate an adjustment button so as to place the calibration marker within these adjustment frames one after another, whereby camera parameters are changed. Upon completion of all adjustments relative to the three axes of the coordinate system, the changed camera parameters are stored in a memory.

The above-described technique disclosed by Patent Document 1 and Patent Document 2 is advantageous in allowing camera calibration with the relatively simple construction. However, the worker needs to effect adjustments relative to the three axes manually, while continuously viewing a display screen. So, the calibration takes a long time and the calibration precision tends to be unstable, depending on the skill/experience of each individual worker. So, there is the possibility of a product with insufficient or inappropriate calibration being forwarded inadvertently to the subsequent production process. Then, as shown in JP2008-131250 A (Patent Document 3) and JP2008-131177 A (Patent Document 4) for instance, there have been proposed a further technique that obtains camera parameters (projection parameters) through calculation of rotation matrices of the camera.

According to these technique, a first matrix is calculated based on coordinates in a reference coordinate system of a calibration point set at a designed position in the reference coordinates system. And, a second matrix is calculated based on coordinates in an image coordinate system of the calibration point specified from a captured image of the camera. Further, based on the first matrix and the second matrix calculated as above, a rotation matrix (third matrix) of the camera is calculated. In addition, for effecting the calibration by automatic calculations, Patent Document 3 and Patent Document 4 provide an acceptance/rejection deciding section for deciding acceptance or rejection of the calibration result. If the acceptance/rejection deciding section decides rejection of the calibration result, transfer to the subsequent step is restricted so that the product with insufficient calibration may not be forwarded inadvertently to the subsequent step.

SUMMARY OF THE INVENTION

The technique disclosed by Patent Document 3 and Patent Document 4 are superior in that the ideal camera calibration is made possible by the calculation of camera rotation matrix, without relying on the "worker's visual alignment" which is the case with Patent Document 1 and Patent Document 2. Notwithstanding, this technique restricts transfer to the next step if the acceptance/rejection deciding section decides rejection on the result of automatic calibration. So, even when a product only slightly fails to satisfy the acceptance criteria, this product too is found defective uniformly. Hence, the number of partly finished products rejected from the production line will increase, so that the productivity may deteriorate.

Therefore, there is a need for a calibrating apparatus for an on-board camera of a vehicle, which apparatus allows completion of calibration process with a simple additional calibration, even when rejection has issued on the result of automatic calibration.

In view of the above-described background, according to one aspect of a calibrating apparatus for an on-board camera of a vehicle relating to the present invention, there is provided a calibrating apparatus for an on-board camera of a vehicle, comprising:

an image acquiring section for acquiring a captured image captured by the camera including, within a field of view, calibration markers arranged at a plurality of predetermined differing positions;

a calibration point specifying section for specifying each calibration point in each one of the calibration markers in the captured image;

an automatic adjusting section for effecting automatic adjustment of a camera parameter of the on-board camera, with using the specified calibration point;

a display controlling section for causing a displaying section to display a confirmation marker in the form of a graphic image in superposition with the captured image, the confirmation marker being configured to specify, in the captured image, a position of theoretical coordinate of the calibration point calculated with using the camera parameter at the time of completion of the automatic adjustment;

an instruction input receiving section for receiving an instruction capable of moving the confirmation marker in a screen displayed at the displaying section;

a manual adjusting section for effecting manual adjustment on the automatically adjusted camera parameter, based on a displacement amount of the theoretical coordinate of the calibration point corresponding to a movement amount of the confirmation marker; and a camera parameter setting section for setting an undetermined camera parameter which is the camera parameter at the time of completion of most recent adjustment by the automatic adjusting section and the manual adjusting section, as said camera parameter, in response to a determination instruction received by the instruction input receiving section.

With the above construction, at the time of completion of the adjustment by the automatic adjusting section, the calculated camera parameter is set as an undetermined camera parameter. And, with using this undetermined camera parameter, the position of the theoretical coordinate of the calibration point is calculated. And, a confirmation marker indicating this position of the theoretical coordinate is displayed in the form of a graphic image in superposition with the camera captured image. So, the worker can easily confirm the result of automatic adjustment. And, if the worker finds this result of automatic adjustment insufficient, the worker will then give an adjustment instruction input capable of moving the confirmation marker in a screen displayed at the displaying section so that the confirmation marker may be moved to the appropriate position. Further, the manual adjusting section effects manual adjustment on the automatically adjusted camera parameter, based on a displacement amount of the theoretical coordinate of the calibration point corresponding to the amount of the movement of the confirmation marker. In response to the worker's providing the confirmation instruction input, the undetermined camera parameter, which is the camera parameter at the time of completion of most recent adjustment by the automatic adjusting section and the manual adjusting section, is now set as the camera parameter, upon which the calibration is completed properly. In this way, according to the inventive construction, it has become possible to provide a calibrating apparatus for an on-board camera of a vehicle, which apparatus allows completion of calibration process with a simple additional calibration, even when rejection has issued on the result of automatic calibration. That is, according to the above construction, rather than the full-automatic calibration, a "semi-automatic calibration" including a worker's visual confirmation on the result of the automatic calibration and a worker's manual adjustment after the automatic calibration can be realized in a rational manner. With the inclusion of manual adjustment, the time period required for the calibration work can be shortened and at the same time the inconvenience of a defect product being inadvertently mixed in shipped products can be prevented. Further, in case the calibration by the automatic calibration is found insufficient, further calibration can be continued with manual adjustment. So, the possibility of the product being inadvertently rejected as a defect from the production line can be reduced, whereby the productivity can be improved.

According to a further aspect of the present invention, there is provided a calibrating apparatus for an on-board camera, the apparatus comprising:

an image acquiring section for acquiring a captured image captured by the camera including, within a field of view, calibration markers arranged at a plurality of predetermined differing positions in a three-dimensional reference coordinate system;

a calibration point specifying section for specifying each calibration point in each one of the calibration markers in the captured image which is a projecting plane of a three-dimensional camera coordinate system of the on-board camera;

an automatic adjusting section for automatically adjusting a camera parameter with using the specified calibration point, the camera parameter defining the camera coordinate system relative to the reference coordinate system;

a display controlling section for causing a displaying section to display a confirmation marker in the form of a graphic image in superposition with the captured image, the confirmation marker being configured to specify, in the captured image, a position of theoretical coordinate of the calibration point in the projecting plane, calculated with using the camera parameter at the time of completion of the automatic adjustment;

an instruction input receiving section for receiving an instruction capable of moving the confirmation marker in a screen displayed at the displaying section;

a manual adjusting section for effecting manual adjustment on the automatically adjusted camera parameter, based on a displacement amount of the theoretical coordinate of the calibration point corresponding to a movement amount of the confirmation marker; and a camera parameter setting section for setting an undetermined camera parameter which is the camera parameter at the time of completion of most recent adjustment by the automatic adjusting section and the manual adjusting section, as said camera parameter, in response to a determination instruction received by the instruction input receiving section.

BRIEF DESCRIPTION OF THE DRAWINGS

The essence of the above-described invention and further and other features and aspects of thereof will become apparent upon reading the following detailed description with reference to the accompanying drawings.

FIG. 3 is a block diagram schematically showing an example of an on-board system construction including a calibrating apparatus for an on-board camera relating to the present invention, FIG. 6 is a block diagram schematically showing an example of construction of the on-board camera calibrating apparatus of the invention.

DETAILED DESCRIPTION

Next, an embodiment of an inventive calibrating apparatus will be described with reference to the accompanying drawings, taking as an example a case of calibrating a camera 1 (on-board camera) for capturing a rear visual scene of a vehicle 90. The camera 1 (on-board camera) is mounted upwardly of a rear number plate of the vehicle 90 at a position laterally offset from the axle, with the optical axis thereof being oriented downward (e.g. 30 degrees downward from the horizontal). The camera 1 includes e.g. a wide-angle lens having a view angle ranging from 110 to 120 degrees, thus being capable of capturing a region (space) extending about 8 meters rearwards. This camera 1 is to be calibrated for absorbing mounting error when it is mounted to the vehicle 90 at e.g. the manufacturing factory of the vehicle. Or, the camera 1 is to be calibrated for correcting any displacement thereof which may have occurred due to accumulated traveling vibration or shock applied thereto.

Figure 1:
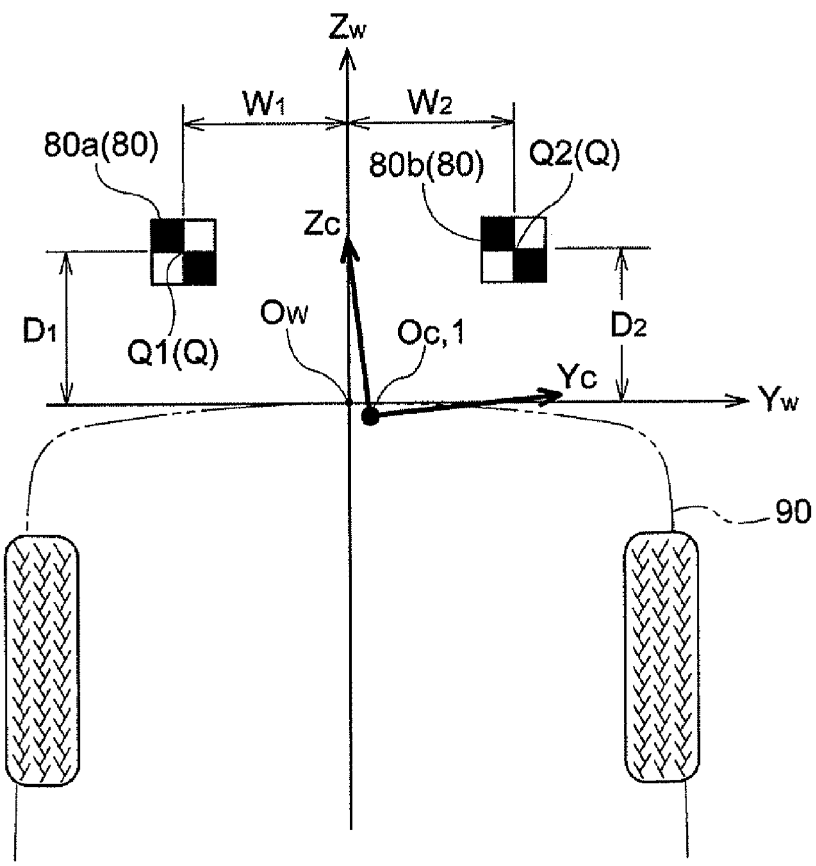
FIG. 1 is an explanatory view showing an example of disposing relationship between calibration markers and a vehicle.
Figure 2:
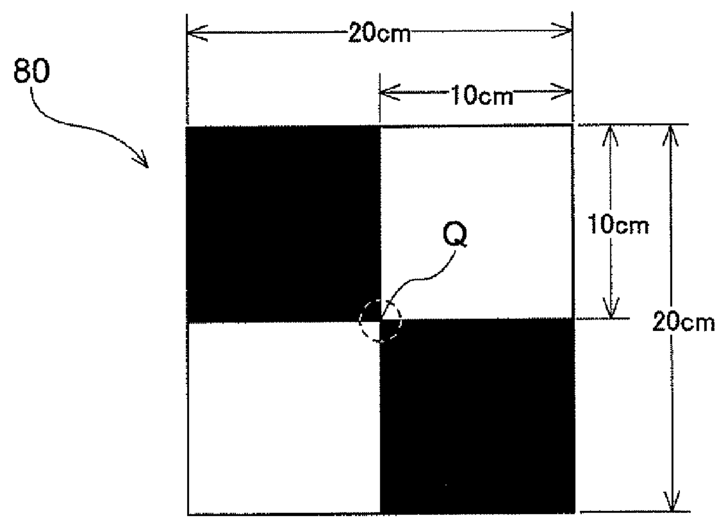
FIG. 2 is an explanatory view showing an example of calibration marker.

As shown in FIG. 1, the marker 80 (calibration marker) is provided at two positions within the view field of the camera 1. And, the markers 80 are disposed at designed positions so that their coordinate values in the world coordinate system may be known. In the present example, the marker 80 has a black and white checkered pattern as shown in FIG. 2. The point Q at the center of the marker 80 is the calibration point, which constitutes the basis for the calibration of the camera 1. That is to say, the marker 80 is disposed such that the coordinate of this calibration point Q is known in the world coordinate system. Incidentally, in the present example, the calibration marker 80 is comprised of four squires, i.e. two white squires and two black squares. Alternatively, the marker 80 may be comprised of four or more squares or rectangles. The number of sqares is not particularly limited in this invention. And, the markers 80 may be provided at three or more positions, or at any number of plurality of positions. And, the calibration points Q too may be provided at three or more differing coordinates.

In the example shown in FIG. 1, the two markers 80 are disposed on a floor surface corresponding to the $Y_W Z_W$ plane in the world coordinate system, in right/left symmetry relative to the main axis of the vehicle corresponding to the $Z_W$ axis of the world coordinate system ($D_1=D_2$, $W_1=W_2$). However, the right/left symmetric layout is not absolutely needed, its layout may be freely chosen as long as the coordinate values are known. Common layout of the markers 80 among different factories or the like will be advantageous in that a same calibrating apparatus may be commonly used therein. However, some difference in the layout or disposition of the markers 80 can often be readily coped with by change of the program or parameters. Therefore, the markers 80 may be disposed as desired, depending on such factors as the relationship with the size of the space and other systems that can be secured at a factory.

The size of the marker 80 may be appropriately chosen according to such factors as the resolution of the camera 1, the performance of the image processing function provided in the calibrating apparatus, the disposing position of the marker, etc. so that the calibration point Q may be detected with high precision. As an example, in case its $D_1$ and $D_2$ respective ranges from 1 to 2 meters and its $W_1$ and $W_2$ respectively is about 1.5 meters, as shown in FIG. 2, there will be employed a 20 to 30 cm square marker 90, with each white/black area being 10 to 15 cm square.

Incidentally, the markers 80 may be disposed on a vertical face such as a wall face or a partition. In such case too, the world coordinates ($X_W$, $Y_W$, $Z_W$) of the calibration point Q can be detected with precision. That is to say, the markers 80 may be disposed on any desired face including a floor face, a wall face, as long as such face is within the field of view of the camera 1. In this particular embodiment, since the camera 1 is mounted with the downward orientation on the vehicle, it is not appropriate to dispose the markers 80 on a ceiling face. However, it is needless to say that the markers 80 may be disposed on the ceiling face, in case this ceiling face is within the field of view of the camera 1. Also, the markers 80 need not be disposed perpendicular to the axes of the world coordinate system ($X_w$, $Y_w$, $Z_w$). Further, the two markers 80 may be disposed on different faces, e.g. one of them being disposed on the floor face, the other being disposed on the vertical partition. What is important here is the calibration points Q and the markers 80 may be disposed on any desired face(s). Namely, the disposing direction of the markers 80 can be freely chosen as long as the calibration points Q can be precisely disposed in the world coordinate system and the calibration points Q can be detected well from a captured image of the camera 1.

In the instant embodiment, the vehicle 90 mounts a parking assisting apparatus and the scene around the vehicle 90 captured by the camera 1 is utilized by this parking assisting apparatus. This parking assisting apparatus is configured to be manually set by the driver at the time of a reverse driving for a garage parking, a parallel parking, etc. or to be automatically set for guiding the vehicle 90 to a parking location confirmed by the driver. In this guiding, e.g. a steering angle of the steering wheel maneuvered by the driver is detected and an expected path of the vehicle 90 resulting therefrom will be displayed in superposition with the captured image. In a further guiding operation, the steering control will be automatically effected to guide the vehicle 90 to the parking location.

FIG. 3 is a block diagram schematically showing an example of a system construction of the vehicle 90 mounting such parking assisting apparatus 40. The parking assisting apparatus 40 includes a CPU (central processing unit) 5 for executing various sophisticated image processing operations such as image recognition as will be described later and constituting the core component of the parking assisting apparatus 40. The CPU 5 executes various operations with utilizing programs stored in a program memory 6 and/or parameters stored in a parameter memory 7. In this example, these program memory 6 and parameter memory 7 comprise non-volatile memories provided separately from the CUP 5. However, these memories may be integrated within a same package as the CPU 5. The parking assisting apparatus 40, together with the CPU 5, the memories and other peripheral devices, are constructed as a parking assisting ECU (electronic control unit) 9. In this example, the CPU 5 constitutes the core component. However, the core component of the parking assisting apparatus 40 may be any other arithmetic logic processor, a logic circuit, etc.

As shown in FIG. 3, an image captured by the camera 1 is displayed on a monitor device 4, via an image processing module 2 including such components as a superimposing section 2*a*, a graphic rendering section 2*b*, a frame memory 2*c*, etc. The camera 1 is a digital camera configured to capture (pick-up) from 15 to 30 frames per second of two dimensional images with using an image pickup device such as a CCD (charge coupled device), a CIS (CMOS image sensor) and effect digital conversion of the image and output video data. Each frame of the two-dimensional image is stored in the frame memory 2*c* and image processing and graphic superimposition for each frame are possible. An image graphic rendering instruction to the graphic rendering section 2*b* and a graphic superimposing instruction to the superimposing section 2*a* are issued from the CPU 5.

The monitor device 4 functions also as a monitor device for the navigation system. As shown in FIG. 3, the monitor device 4 includes a displaying section 4*a*, a touch panel 4*b* provided in the displaying section 4*a* and a speaker 4*c*. The displaying section 4*a* displays a captured image of the camera 1, a graphic image, a synthesized image comprising synthesis of these images, etc., all provided from the image processing module 2. As an example, the displaying section 4*a* is comprised of a liquid crystal display. The touch panel 4*b* is formed with the displaying section 4*a* and constructed as a pressure-sensitive or electrostatic type instruction inputting device capable of outputting a touched position touched by a finger or the like as location data. FIG. 3 shows the example in which the speaker 4*c* is included in the monitor device 4. Instead, the speaker 4*c* may be provided at any other location such as on the inner side of the door. The speaker 4*c* outputs a voice or a sound provided from a voice processing module 3 according to an instruction from the CPU 5. Incidentally, the CPU 5 may be configured to simply issue an alarm sound by a buzzer 8, when needed.

The CPU 5 is connected to various kinds of systems and sensors via an on-board network indicated by numeral 50 in FIG. 3 to be capable of communicating with them. In the instant embodiment, a CAN (controller area network) 50 is provided as an example of the on-board network. As shown in FIG. 3, the parking assisting apparatus 40 (CPU 5) is connected with a power steering system 31, a brake system 37 mounted on the vehicle and connected also with an external system 33 via an external connection terminal or the like. These respective systems are comprised of electronic circuits as CPU, like the parking assisting apparatus 40, as core components thereof and include ECU's as their peripheral circuits, just like the parking assisting ECU 9.

The power steering system 31 is an electric power steering system (EPS) for providing additional torque to the steering wheel or driving the steering wheel by means of an actuator 41. The brake system 37 is an electric power braking system including e.g. a brake assist for adding braking force with using an actuator 47, an ABS (anti lock braking system) for restricting occurrence of locking of the brake. The external system 33 is an optional system, to which a dealer or a user may connect, via a connector, an inspection system, an adjusting system for use in production, inspection, repair, etc. of the vehicle 90.

The parking assisting apparatus 40 executes a parking assisting control in cooperation with various sensors and based on results of detections by these sensors. In FIG. 3, as non-limiting examples of various kinds of sensors, a steering sensor 21, a wheel speed sensor 23, a shift lever switch 25 and an accelerator sensor 29 are connected to the CAN 50. And, a steering torque sensor 22, a brake sensor 27, etc. are connected to the CAN 50 via a power steering system 31 or a brake system 37.

The steering sensor 21 is a sensor for detecting a steering amount (rotation angle) of the steering wheel and this sensor is comprised with using e.g. a hall element. The torque sensor 22 detects an operational torque applied by the driver to the steering wheel. The wheel speed sensor 23 is a sensor for detecting a rotational speed of the wheels of the vehicle 90, such as the rotational amount, the number of rotations per unit time, etc. and this sensor is comprised with using e.g. a hall element. The brake sensor 27 is a sensor for detecting an operational amount of the brake pedal. The shift lever switch 25 is a sensor or a switch for detecting the position of the shift lever and this switch is constructed using a displacement switch or the like.

The various kinds of systems and sensors and the modes of their interconnections shown in FIG. 3 are only non-limiting examples. Any other constructions and/or connection modes can be used instead. Further, as described above, the sensors can be connected directly to the CAN 50 or connected thereto via various kinds of systems.

As discussed above, the parking assisting apparatus 40 is comprised of the CPU 5 as its core component and effects various kinds of calculations for parking assistance, in cooperation with the programs (software) stored in the program memory 6. For effecting the above-described parking assistance, it is needed that the coordinate system of the captured image obtained by the camera 1 and the coordinate system of the image for use in the image processing match with high precision. As a matter of fact, the designed ideal correlation therebetween can hardly be obtained due to error or tolerance in the manufacturing precision of the camera 1 per se and/or in the mounting precision of the camera 1 to the vehicle 90. For this reason, the parking assisting apparatus 40 includes the parameter memory 7 for storing camera parameters for use in matching of the correlation between the two coordinate systems. More particularly, the parking assisting apparatus 40 functions in cooperation with the hardware of the CPU 5, the programs (software) stored in the program memory 6, and the camera parameters stored in the parameter memory 7.

The camera parameters are values which are variable according to the mounting condition of the camera 1 to the vehicle 90. Therefore, in the production process of the vehicle 90, it is necessary to effect calibration of the camera 1 and determine the camera parameters for the precise matching between the two coordinate systems. That is to say, there is a need to calibrate the camera 1 by specifying the relationship between the reference coordinate system and the camera coordinate system of the camera 1 with camera parameters. And, it is desired that the calibration of the camera 1 be made possible periodically at the repairing/maintenance factory of the vehicle 90 or at the time of inspection/repairing/maintenance after application of some excessive shock to the vehicle 90. For this reason, the vehicle 90 mounts a calibrating apparatus 10 for calibrating the camera 1. Or, the calibrating apparatus 10 is configured to be connectable to the vehicle 90. And, the parameter memory 7 is comprised of a rewritable storage medium, so that the camera parameters will be revised to new camera parameters determined by calibration.

As one possible mode of implementation, the CPU 5 and the program memory 6 constituting the parking assisting apparatus 40 may be utilized as the calibrating apparatus 10. Or, the calibrating apparatus 10 may comprise the CPU 5 and a further program memory than the program memory 6 constituting the parking assisting apparatus 40. Still alternatively, the calibrating apparatus 10 may be constructed as an external system 33. In the present embodiment, there will be explained an exemplary case in which the CPU 5, the program memory 6 and the parameter memory 7 constituting the parking assisting apparatus 40 are utilized together as the calibrating apparatus 10.

First, the camera parameters and the coordinate system will be described. An image captured by the camera 1 is two-dimensional, but the actual space is three-dimensional. Therefore, in the parking assisting apparatus 40, there is a need for inter-conversion between the two-dimensional space and the three-dimensional space. And, for this conversion, it is desired that all camera parameters be set with high precision.

The camera parameters can generally be divided into interior parameters and exterior parameters. The interior parameters of the camera mean parameters relating to the optical system provided inside the camera. In the case of a digital camera, these are parameters set based on a distance between the image pickup element and the center of the lens (focal distance), the size of the image pickup element and the number of pixels, an angle between the vertical row and the horizontal row of the pixels, etc. Strictly speaking, these interior parameters too are not fixed, but can be different from one camera to another. However, such difference may be considered insignificant as being much smaller than difference in the mounting precision of the camera 1 to the vehicle 90. In this example, it is therefore assumed that the interior parameters have been set with good precision.

Figure 4:
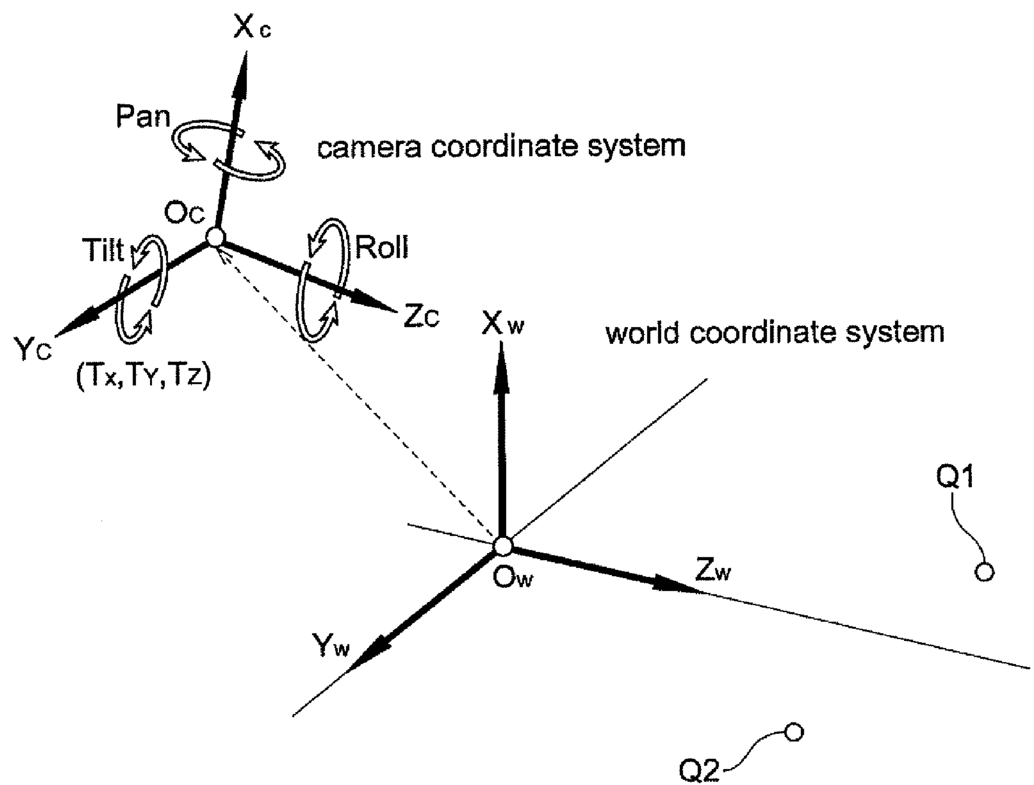
FIG. 4 is an explanatory view showing relationship between the world coordinate system and a camera coordinate system.

The exterior parameters are parameters relating to the position, the posture of the camera relative to the reference coordinate system (world coordinate system). In the present embodiment, the exterior parameters correspond parameters dependent on the mounting precision of the camera 1 to the vehicle 90. The exterior parameters include translation parameters relating to the camera position and rotation parameters relating to the camera posture. As shown in FIG. 1 and FIG. 4, the camera coordinate system ($X_C$, $Y_C$, $Z_C$) exists, with one point in the world coordinate system ($X_W$, $Y_W$, $Z_W$), which is the coordinate system of the three-dimensional space, being the center Oc of the coordinate system. That is, the camera 1 will be mounted to the vehicle 90 at a position and under a posture that form the camera coordinate system about predetermined coordinate in the world coordinate system as the reference coordinate system, as the coordinate system center Oc. The designed position where the camera 1 is to be mounted is defined by the coordinate of the coordinate center Oc of the camera coordinate system in the world coordinate system.

The position at which the camera 1 is mounted, that is, the position of the camera coordinate system, is defined by translation components ($T_X$, $T_Y$, $T_Z$) respectively parallel with the respective axes of the world coordinate system which is a three-dimensional coordinate system. In general, the translation components T are defined by a matrix of three rows by one column. If a deviation occurs between the defined position and the actual mounting position of the camera 1, this deviation becomes an error in the translation components T in the exterior parameters. However, this error in the translation components T gives only small feel of difference to the driver. And, as this error in the mounting position is hardly affected by the distance from the camera 1 and the subject of image capture, its effect to the image processing is small also. Namely, respecting the mounting position of the camera 1, if an appropriate tolerance is set in the production process and this tolerance is appropriately controlled, it is hardly problematic to suppose that the translation parameters have been set with good precision.

The mounting posture of the camera 1, that is, the rotation of the camera coordinate system, is defined by rotation components R, about the respective perpendicular axes of the camera coordinate system which is a three-dimensional coordinate system. In general, the rotation components are defined by a matrix of three rows by three columns. For instance, as shown in FIG. 4, if there occurs a roll, i.e. rotation of the camera 1 about the $Z_C$ axis, the captured image will be inclined, thus giving a strong sense of visual discomfort or difference to the driver viewing the captured image. Also, in the event of a pan, i.e. rotation of the camera 1 about the $X_C$ axis or a tilt, i.e. rotation of the camera 1 about the $Y_C$ axis, these will result in a change in the distance from the camera 1 to the subject of image capture. Therefore, the position of the image capture subject will change significantly in the captured image, thus providing significant effect to the image processing as well. Therefore, it is important that the rotation parameters be adjusted with good precision according to the mounting posture of the camera 1 to the vehicle 90, thereby to calibrate this camera 1.

As described above, the camera parameters include interior parameters, the translation parameters T and rotation parameters R. Of these, high precision adjustment of the rotation parameter R, as one of the exterior parameters, is important. As may be understood from FIG. 1 and FIG. 4 also, even when the camera 1 was mounted to the vehicle 90 without error, there still exists rotation of the camera coordinate system relative to the world coordinate system. Therefore, the rotation parameter R for the case when the camera 1 was mounted at the ideal position and under the ideal posture can be set uniquely as a "designed value". The calibrating apparatus 10 according to the present invention is configured to calibrate the camera 1 by adjusting this rotation parameter R according to the actual mounting posture of the camera 1.

Figure 5:
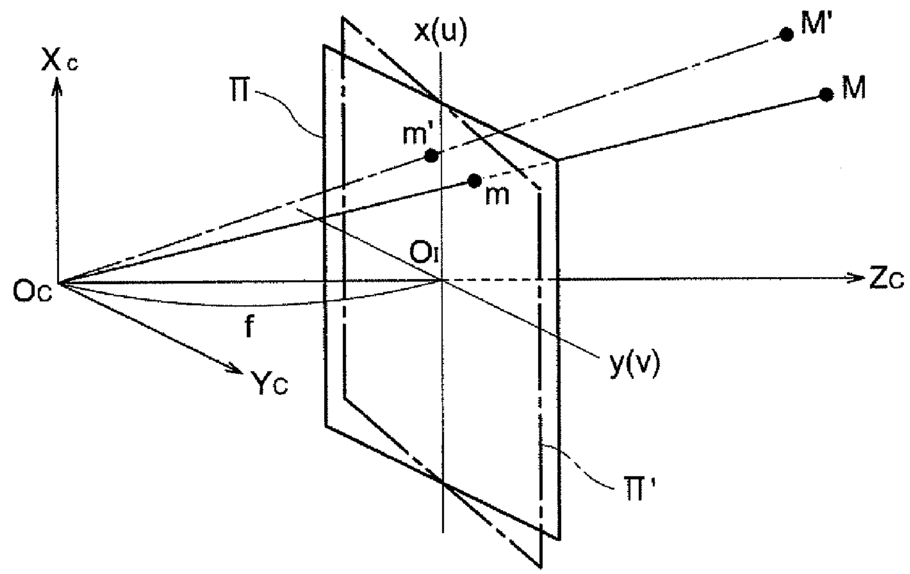
FIG. 5 is an explanatory view showing relationship between the camera coordinate system and an image coordinate system.

Now, there will be explained the relationship between the three-dimensional camera coordinate system ($X_C$, $Y_C$, $Z_C$) and the two-dimensional coordinate system (x, y). The image coordinate system (x, y) is a two-dimensional orthogonal coordinate system existent in the two-dimensional projecting plane (projecting plane Π) orthogonal to the $Z_C$ axis of the camera coordinate system in agreement with the optical axis of the camera 1, as shown in FIG. 5. The projecting plane Π is present at a distance of focal distance (f) of the camera 1 from the origin Oc of the camera coordinate system in the $Z_C$ axis direction of the camera coordinate system. In FIG. 5, u axis represents the direction of the vertical row of the pixels of the image pick-up device of the camera 1, while v axis represents the direction of the horizontal row of the pixels of the image pick-up device of the camera 1. Ideally, the u axis and the y axis are in agreement respectively with the x axis and the y axis f the image coordinate system. And, the angle formed between the u axis and the v axis is ideally 90 degrees, like the angle formed between the x axis and the y axis of the image coordinate system. This angle is one of the interior parameters described above. In this example, this angle is assumed to be the ideal angle of 90 degrees, as described above.

With precision matching between the camera coordinate system and the world coordinate system, as shown in FIG. 5, a point present at coordinate M in the world coordinate system will be coordinate-converted from the camera coordinate system to the image coordinate system, as being present at the coordinate (m) in the image coordinate system. Conversely, a point detected in a captured image, i.e. detected at the coordinate m in the image coordinate system can be coordinate-converted through the camera coordinate system as a point present at the coordinate M in the world coordinate system, under a fixed condition, such as being present on a floor face.

On the other hand, in the case of absence of precision matching between the camera coordinate system and the image coordinate system, as shown in FIG. 5, a projecting plane Π' of the camera coordinate system of the actual camera 1 becomes a different plane from the projecting plane Π of the ideal camera coordinate system. Therefore, no matching becomes possible between the camera coordinate system of the camera 1 actually mounted on the vehicle 90 and the world coordinate system. For instance, the point present at the coordinate M in the world coordinate system will be detected as being present at coordinate m' in the projecting plane Π' of the camera coordinate system of the actual camera 1. And, this coordinate m' will be treated as the coordinate in the projecting plane Π of the ideal camera coordinate system and will be coordinate-converted through the camera coordinate system to the world coordinate system. That is to say, the point present at the coordinate M in the world coordinate system will be coordinate-converted as a point present at the coordinate M' in the world coordinate system, as shown in FIG. 5.

With occurrence of such error as above, the parking assisting apparatus 40 becomes unable to provide precision parking assistance. Then, in order to restrict such error as above, the calibrating apparatus 10 is configured to adjust the rotation parameters R and to define the relationship between the world coordinate system or the ideal camera coordinate system and the camera coordinate system of the camera 1 actually mounted to the vehicle 90. This process is defined herein as a calibration of the camera 1. For the adjustment of the rotation parameter R, there are such methods as a method of obtaining an adjustment parameter by correcting the ideal rotation parameter R per se according to the actual mounting posture of the camera 1 and a method of calculating the rotation parameter R per se according to the posture of the camera 1. In the instant embodiment, the camera 1 is calibrated by calculating the rotation parameter R per se, through calculation of the so-called rotation matrix according to the mounting posture of the camera 1.

As discussed above, in the present embodiment, the CUP 5, the program memory 6 and the parameter memory 7 constituting the parking assisting apparatus 40 are utilized together as the calibrating apparatus 10. The calibrating apparatus 10 is constituted by inclusion of a plurality of functional sections shown in FIG. 6, in cooperation with the hardware of mainly the CPU 5 and so on and the software (programs) stored in the program memory 6. More particularly, the calibrating apparatus 10 includes an image acquiring section 11, a calibration point specifying section 12, a first matrix calculating section 13, a second matrix calculating section 14, a third matrix calculating section 15, a rotation angle calculating section 16, a camera parameter calculating section 17, a coordinate conversion section 18, a camera parameter setting section 19 and an HMI controlling section 20. The HMI controlling section 20 includes a display controlling section 201 and an instruction input receiving section 202. Further, the first matrix calculating section 13, the second matrix calculating section 14, the third matrix calculating section 15, the rotation angle calculating section 16, the camera parameter calculating section 17 and the coordinate conversion section 18 together constitute an automatic adjusting section 30. The automatic adjusting section 30 is a functional section for effecting automatic adjustment of the camera parameters that define the camera coordinate system relative to the world coordinate system, based on a calibration point detected by the calibration point specifying section 12. And, the calibrating apparatus 10 further includes a manual adjusting section 60, in addition to the automatic adjusting section 30.

The image acquiring section 11 is a functional section for obtaining a captured image captured by the camera 1 mounted to the vehicle 90, with including, within the field of view, calibration markers 80 disposed at a plurality of predetermined different positions in the three-dimensional world coordinate system. The calibration point specifying section 12 is a functional section for specifying the coordinate of each calibration point Q as the actual coordinate in the two-dimensional image coordinate system of the captured image. As will be described later, the calibration point specifying section 12 includes a calibration point distribution region setting section 121, a calibration marker distribution region setting section (image processing target region setting section) 122 and a calibration point detecting section 123. These respective functional sections will be described in greater details later herein.

The first matrix calculating section 13 is a functional section for calculating a first matrix representing vectors of the calibration point Q as seen from the optical center Oc (the origin Oc of the camera coordinate system) of the camera 1 and a straight line extending through the calibration point Q. The second matrix calculating section 14 is a functional section for calculating a second matrix representing vectors of the calibration point Q as seen from the optical center Oc (the origin Oc of the camera coordinate system) of the camera 1 and the straight line extending through the calibration point Q, based on the coordinate of the calibration point Q on the captured image specified by the calibration point specifying section 12. The third matrix calculating section 15 is a functional section for calculating a rotation matrix representing the rotation condition of the camera 1 in the world coordinate system, based on the first matrix and the second matrix. These respective functional sections will be described in greater details later herein.

The rotation angle calculating section 16 is a functional section for separating the rotation matrix intro three rotation angle components relative to the three axes. The camera parameter calculating section 17 is a functional section for calculating the camera parameters of the camera 1 based on the rotation matrix. The coordinate conversion section 18 converts the three-dimensional coordinate values in the world coordinate system of the calibration point Q into coordinate values in the two-dimensional projecting plane Π, based on the camera parameters. That is to say, the coordinate conversion section 18 is a functional section for calculating coordinate values of the theoretical calibration point Q, based upon the camera parameters. These respective functional sections will be described in greater details later herein.

The camera parameter setting section 19 is a functional section for setting temporary camera parameters (undetermined camera parameters) which are the camera parameters at the time of completion of most recent adjustment by the automatic adjusting section 30 and the manual adjusting section 60, as the camera parameters. The camera parameter setting section 19 sets camera parameters based on a specifying input instruction received by the instruction input receiving section 202. The details of this section will be given later herein.

The HMI controlling section 20 is a functional section for effecting interfacing such as reporting to a user (worker of calibration), receiving an operation input from the user with using a visual effect or an audio effect, and transmitting this to the respective functional sections. For instance, the HMI controlling section 20 issues an instruction to the image processing module 2 for specifying a graphic image to be superposed on a captured image and causing the processing module 3 to output a voice (and/or a sound) via the speaker 4*c*. Further, this section can receive an instruction from the user via the touch panel 4*b* and causes a functional section corresponding to that instruction to function to that end. As shown in FIG. 6, the HMI controlling section 20 includes the display controlling section 201 and the instruction input receiving section 202. The specific functions of the display controlling section 201 and the instruction input receiving section 202 will be detailed later herein.

Figure 7:
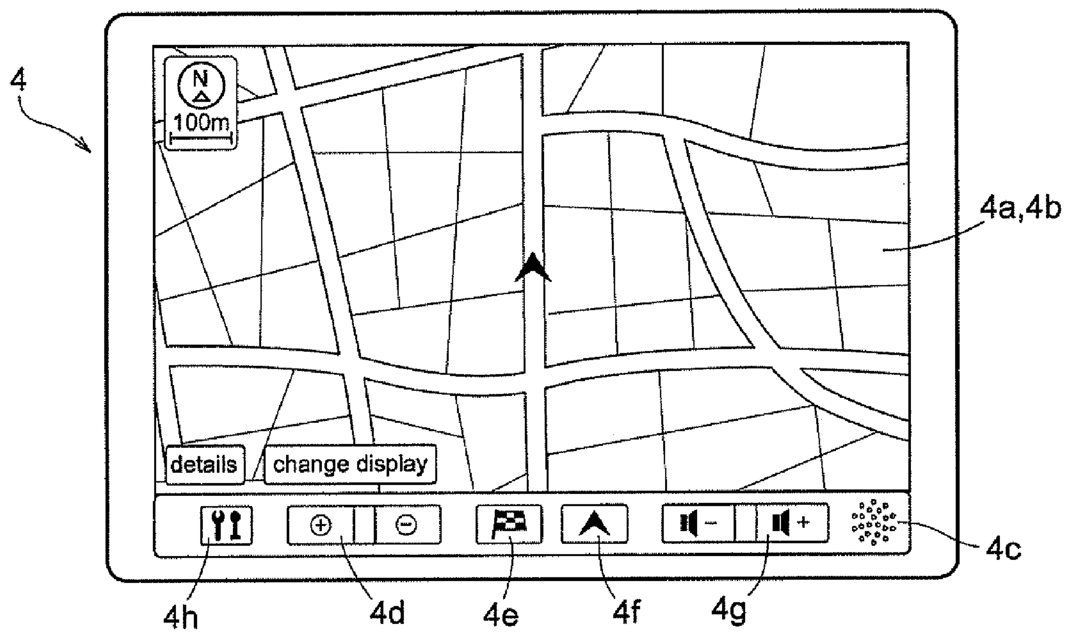
FIG. 7 is a front view showing an example of a monitor device.

In the instant embodiment, the CPU 5, the program memory 6, the parameter memory 7 constituting the parking assisting apparatus 40 are utilized together as the calibrating apparatus 10. Also, the monitor device 4 of the parking assisting apparatus 40 is used also as the monitor device of the navigation system. Therefore, the monitor device 4 is used also as the monitor device of the calibrating apparatus 10. In the front panel of the monitor device 4, various switches as shown in FIG. 7 are provided. Mark 4*d* denotes a button for changing the scale of the map. Mark 4*e* denotes a button for displaying a screen for setting a destination. Mark 4*f* denotes a button for displaying the present position of the vehicle 90. Mark 4*g* denotes a button for a sound volume level adjustment. Mark 4*h* denotes a system setting button for displaying a screen for use in various settings of the system. FIG. 7 shows an exemplary case where a geographical map is displayed together with the present position of the vehicle 90.

In a production factory or a repair factory, a worker will operate the system setting button 4*h* to cause the displaying section 4*a* to display the setting screen; then, the worker will operate a predetermined touch button in the touch panel 4*b*. Then, the instruction input receiving section 202 of the HMI controlling section 20 receives this touch button instruction and the CPU 5 functions as the calibrating apparatus 10 with startup of a camera calibration program. Incidentally, as an alternative arrangement to the above, in the production process, the initial screen may be set to the camera calibration mode and the initial screen may be changed to the navigation system screen in response to a predetermined operation after completion of calibration of the camera 1.

[Image Acquiring Step]

Figure 8:
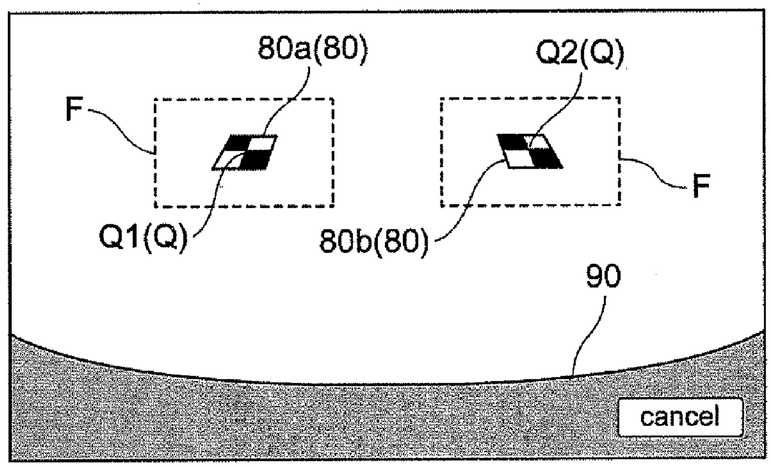
FIG. 8 is a view showing an example of displaying a frame indicative of a region of interest on the monitor device.

With startup of the camera calibration program, that is, when camera calibration is started by the calibrating apparatus 10, first, the image acquiring section 11 acquires a video image captured by the camera 1. This captured image will be displayed on the monitor device 4 through the image processing module 2, as shown in FIG. 8.

[Calibration Point Specifying Step/Region of Interest Setting Step (Image Processing Target Region Setting Step)]

Then, the calibration point specifying section 12 detects the calibration point Q from the captured mage and sets the coordinate of the calibration point Q in the image coordinate system as the actual coordinate. Prior to the detection of the calibration point Q, the region on which the image processing is to be effected is set as a region of interest (ROI) in the projecting plane Π. Namely, the image processing target region on which the image processing for calibration point detection is to be effected is set as the region of interest ROI. Hence, the calibration point specifying section 12 functions also as an image processing target region setting section. This region of interest ROI will be set, based upon a position and a size that are determined taking into consideration a tolerance in the mounting of the camera 1 and a margin needed for the image processing, with the position on the image (on the projecting plane Π) due to an average value of the tolerance as the reference. This region of interest ROI can be set roughly, based on an experimentally obtained tolerance and margin. Since the region of interest ROI is small relative to the captured mage, the calculation load for image processing can be alleviated. Further, alternatively, the region of interest ROI may be set with high precision as described below.

[Calibration Point Specifying Step/Region of Interest Setting Step/Calibration Point Distribution Region Setting Step]

According to one preferred embodiment, the theoretical coordinate values where the calibration point Q is present will be calculated, based on rotation parameters when the camera 1 is mounted at the designed position and under the designed posture appropriately. And, the region in which the theoretical coordinate values are distributed when the camera 1 has been rotated by a predetermined angle about the respective axis of the camera coordinate system will be the calibration point distribution region. Preferably, the calibration point distribution region setting section 121 sets such calibration point distribution region thus obtained as the image coordinate system.

[Calibration Point Specifying Step/Region of Interest Setting Step/Calibration Marker Distribution Region Setting Step]

Figure 9:
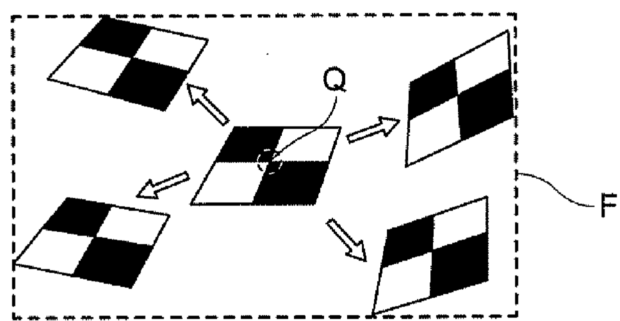
FIG. 9 is an explanatory view illustrating setting principle of the region of interest.

Next, based upon the calibration point distribution region described above, the region in which the markers 80 are distributed in the image coordinate system will be set as the image coordinate system by the calibration marker distribution region setting section 122 as a calibration marker distribution region. In the instant embodiment, this calibration marker distribution region corresponds to the region of interest ROI. Specifically, as shown in FIG. 9, the region of interest ROI will be set with taking possible error in the rotation parameter R in such a manner that the markers 80 will always be contained therein even when errors from ±3 to 5 degrees occur relative to the case of the optical axis of the camera 1 being oriented to the direction of the designed value. Further, preferably, the region of interest ROI will be set, taking into consideration also possible error in the optical center of the camera (origin of the camera coordinate system), i.e. error in the translation parameter T. The calibration marker distribution region corresponds substantially to the image processing target region on which the image processing for calibration point detection. Therefore, the calibration marker distribution setting section 122 functions also as an image processing target region setting section.

The display controlling section 201 causes the displaying section 4*a* to display the image processing target region or the calibration marker distribution region as an ROI frame (region frame) F in the form of a graphic image, in superposition with the captured image (region frame displaying step). The ROI frame F will be displayed together with the captured image as being superposed on this captured image by the displaying section 4*a*. The ROI frame F is set in the projecting plane Π such that the calibration marker 80 disposed at the designed position may be located at the center, in case the camera 1 is mounted ideally, that is, mounted at the designed position and under the designed posture. As shown in FIG. 2, since the calibration point Q is set at the center of the calibration marker 80, the ideal calibration point Q will be located at the center of the ROI frame F as illustrated in FIG. 9.

With the displaying of the ROI frame F in the captured image, the worker can take part in the adjustment operation (calibration operation) of the camera 1 even during on-going automatic adjustment process described below. This can be called "semi-automatic adjustment" (semi-automatic calibration) using automatic adjustment and visual confirmation by a worker in combination. The worker can easily recognize mounting of the camera 1 to the vehicle 90 with a significant error, by finding the marker 80 being out of the ROI frame F. The worker can confirm the setting condition of the camera 1 with interruption of the calibration by giving an instruction input by operating a cancel button displayed on the touch panel 4*b* by the display controlling section 121 as shown in FIG. 8, or stop the calibration and remove the vehicle 90 out of the production process as a defect. Since suspension or stop of automatic adjustment can be instructed by an operation of the touch panel 4*b*, it can be said that the instruction input receiving section 202 and the HMI controlling section 20 including this section 202 function as an adjustment interrupting section (adjustment interrupting means). In case the camera was mounted with a significant error, the adjustment can be interrupted or stopped at an early stage of the adjustment work, so the productivity is improved. Since the CPU 5 continues without any pause the process from the calibration point specifying step to the automatic adjustment step, it is preferred that the ROI frame F for worker's visual confirmation be displayed continuously during the automatic adjustment step also. Similarly, it is also preferred that the touch button for providing the instruction input for interrupting or stopping the adjustment be displayed continuously during the automatic adjustment also.

Incidentally, the matching between the region of interest ROI as the target for image processing and the calibration marker distribution region is not absolutely needed. With taking a margin into consideration, a region of interest ROI larger than the calibration marker distribution region may be set. Further, in the foregoing example, the ROI frame F displayed on the captured image agrees to the region of interest ROI as the target of image processing. However, in such case as the region of interest ROI larger than the calibration marker distribution is set, the ROI frame F may be displayed in superposition and in agreement with the calibration marker distribution region. The same applies to the case when no region of interest ROI is set at all and the image processing is effected for the entire region of the captured image. In such case, by finding the marker 80 being out of the ROI frame F, the worker can readily recognize that the camera 1 is mounted to the vehicle 1 with a significant error relative to the designed value. While it is preferred that region of interest ROI as the target region of image processing and the ROI frame be in agreement, even when they are not in agreement, similar advantageous effect can be achieved. Therefore, an arrangement that the calibration marker distribution region is displayed at the displaying section 4*a* as being superposed as the ROI frame (region frame) F in the form of a graphic image on the captured image will also be very useful.

[Calibration Point Specifying Step/Calibration Point Detecting Step]

Next, the calibration point specifying section 12 specifies the calibration points Q for the area with in the region of interest ROI as the target of image processing. For specifying the calibration point Q, the calibration point specifying section 123 detects the coordinate of the calibration point Q as the center of the marker 80, in the camera captured image. That is, the coordinate in the image coordinate system is detected. As this coordinate is detected based upon the image captured by the camera 1 actually mounted to the vehicle 90, this coordinate corresponds to the "actual coordinate" of the calibration point Q. In the case of a checkered pattern being employed as the marker 80 as in the present embodiment, the detection of the calibration point Q is possible with use of the known corner detector.

More particularly, in the instant embodiment, there is employed a Canny edge detector incorporating a Gaussian filter. The Canny edge detector functions not only to store an edge feature, but to remove noise contained in an image. So, stable edge detection is made possible. Details of the Canny edge detector can be found in e.g. "*J. F. Canny "Finding edges and lines in images*". Masters thesis, ATTR-720. MIT, Cambridge, USA, 1983, etc. So, details thereof will be omitted herein. Needless to say, the invention is not limited to the use of the Canny edge detector. Instead, a Tomasi-Kanade detector, a Harris detector, or any other method can be employed for the edge detection.

Figure 10:
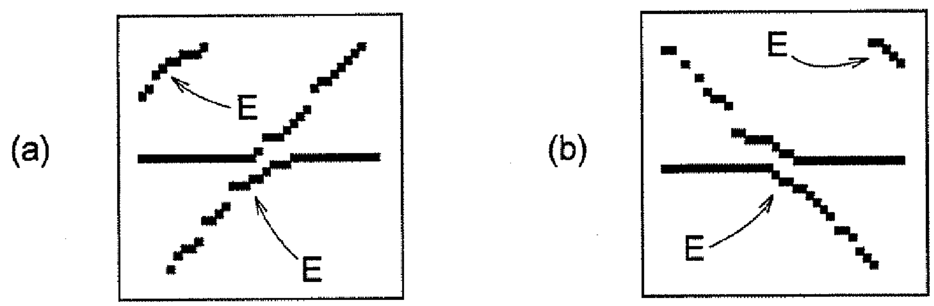
FIG. 10 is an explanatory view showing an example of an image after edge detection.

As described above, the camera 1 has a wide-angle lens, so the captured image thereof has distortion. For the detection of the calibration point Q, straight line recognition is needed, as will be described later. Then, on the image data after edge detection, a distortion correction is effected. Needless to say, alternatively to the above, the distortion correction can be effected before the edge detection, that is, on the original image within the area of the region of interest ROI, or the distortion correction can be effected on the entire captured image. However, since the captured image or the image within the area of the region of interest ROI in the captured image comprise color gray image data, the data amount is large and the calculating load will be significant. In the present embodiment, the data after edge detection comprise monochrome binary data comprising edge point groups E as illustrated in FIG. 10, so the data amount is much smaller and the calculating load is much lower as well. FIG. 10 (*a*) shows edge point groups E of the marker 80*a* after the implementation of the distortion correction. FIG. 10 (*b*) shows edge point groups E of the marker 80*b* after the implementation of the distortion correction.

Figure 11:
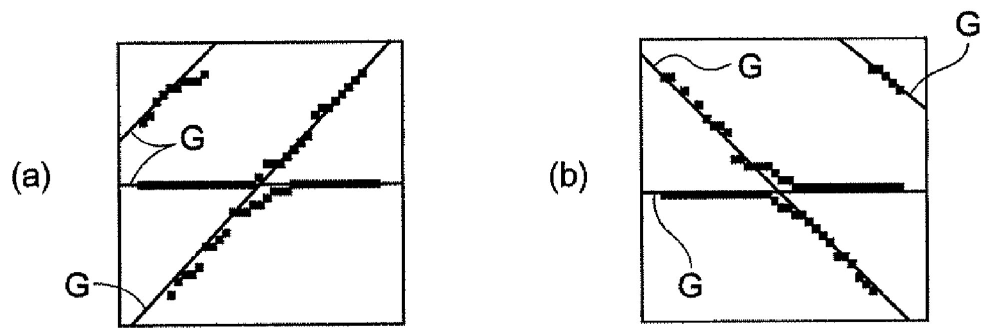
FIG. 11 is an explanatory view showing an example of straight line detection.

Subsequently to the above, on these edge point groups E, a straight line detection operation (straight line matching) is effected. For this straight line detection, such techniques as the least square method, Hough transform, etc. could be used. However, these techniques require large calculating load. So, in the present embodiment, the RANSAC (RANdom Sample Consensus) method much lower in the calculating load than the above techniques is employed to effect straight line matching for straight line detection. With the RANSAC technique, the minimum number of points are selected from the edge point group E and a fitting models is set. The minimum number of dots is two in the case of a straight line. So, randomly selected two points connecting a straight line will be set as the straight line model. Then, evaluation is made to what extent the other points in the edge point group E match this straight line model. In succession, two such points will be selected for a predetermined number of times and evaluation will be repeated. And, the straight line model having the highest matching degree will be determined as the straight line model. FIG. 11 shows an example a straight line G is applied to the edge point groups E shown in FIG. 10.

Figure 12:
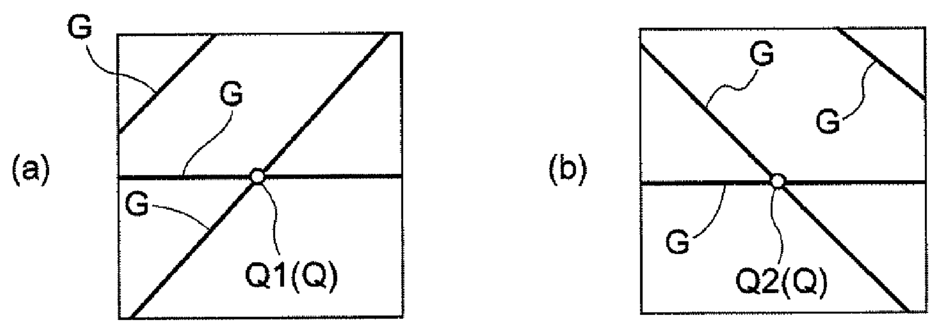
FIG. 12 is an explanatory view showing an example of calibration point detection.

With application of the straight line G, next, the coordinate values of the intersection point of the applied straight line G will be calculated. Since the straight line G is a linear function, with simple calculation, the intersection coordinate (calibration point Q) in the image coordinate system can be specified as shown in FIG. 12. Incidentally, since this coordinate is the coordinate (actual coordinate) in the projecting plane of the camera coordinate system of the camera 1 mounted to the vehicle 90, this coordinate will differ from the coordinate in the projecting plane of the ideal camera coordinate system, unless the camera 1 is mounted without any error at all.

[Automatic Adjustment Step]

Supposing the camera 1 is mounted at the designed position and under the designed posture without any error at all, that is, in the projecting plane of the ideal camera coordinate system, the coordinate in the theoretical coordinate for specifying each calibration point is set as the "initial coordinate". That is to say, the "initial coordinate" is the coordinate that specifies the calibration point in the projecting plane by the initial value of the camera parameter defining the camera coordinate system relative to the world coordinate system, when the camera coordinate system and the world coordinate system satisfy the ideal relationship with each other. This “initial coordinate” will differ from the “actual coordinate” unless the camera 1 is mounted perfectly, i.e. without any error at all. Next, there will be described a process of calibration of the camera 1 in which the rotation parameter included in the exterior parameters of the camera parameters is obtained according to the actual mounting posture of the camera 1 to revise the camera parameter.

Figure 13:
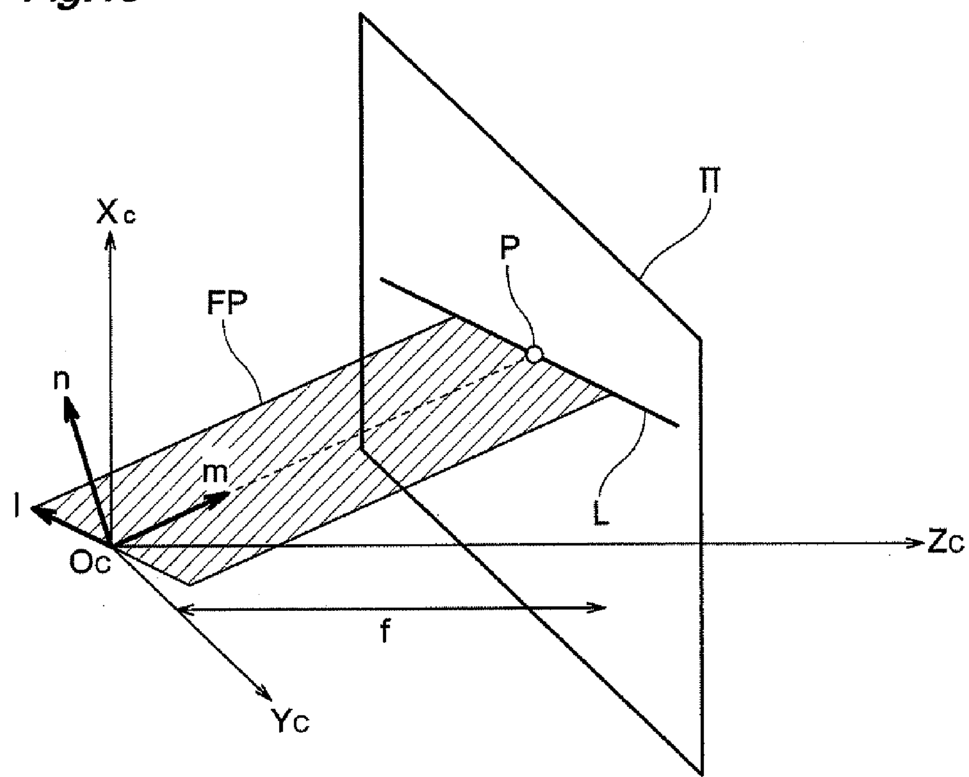
FIG. 13 is an explanatory view showing N vector.

In the instant embodiment, in the automatic adjustment step, the rotation parameter is obtained by effecting a vector calculation using the N vector. First, the N vector will be explained. As shown in FIG. 13, if the image plane having a Cartesian coordinate system is interpreted as a two-dimensional projecting plane (projecting plate Π), then, any points and straight lines are represented by a homogeneous coordinate consisting of three non-zero real numbers. The homogeneous coordinate is preferred for solution of calculation problem encountered in image processing. The simplest measure for the solution is to set the three components of the homogeneous coordinate as being always unit vectors. The set of normalized homogeneous coordinates represented as unit vectors is referred to as the N vector.

In FIG. 13, a point P is a point on the projecting plane Π, a mark (f) denotes the focal distance, which is the distance from the view point Oc (corresponding to the origin OC of the camera coordinate system) to the projecting plane. The $Z_C$ axis of the three-dimensional orthogonal coordinate is orthogonal to the projecting plane Π and the $X_CY_C$ plane is parallel to the projecting plane Π. N vector m represents the point P from the view point Oc as the start point and this is a unit vector. N vector n is a unit normal line vector normal to the plane FP determined by a straight line L passing the point P and the view point Oc. That is, the N vector n is a vector representing the straight line L. Incidentally, vector 1 is not an N vector, but a unit vector representing the orientation of the straight line L.

Now, let us suppose that the camera has been rotated, with the view point (origin of the camera coordinate system) Oc which is the optical center of the camera shown in FIG. 13 being fixed. With this rotation of the camera, the coordinates of the point P and the straight line L on the projecting plane Π are changed and the N vectors too are changed. That is to say, with the above, there are given the point P and the straight line L passing the point P on the projecting plane prior to the rotation and a point P' and a straight line L' passing the point P' on the projecting plane after the rotation. In this, a camera rotation matrix R that causes agreement between the point P and the point P' and the alignment between the straight line L and the straight line L' including their orientations is determined uniquely as shown by the formula (1) below. Where, l' is the unit vector representing the orientation of the straight line L', m' is the N vector representing the point P', n' is the N vector representing the straight line L'.

$$R = R_2 R_1^T = (l' \quad m' \quad n') \begin{pmatrix} l \\ m \\ n \end{pmatrix} \tag{1}$$

Figure 14:
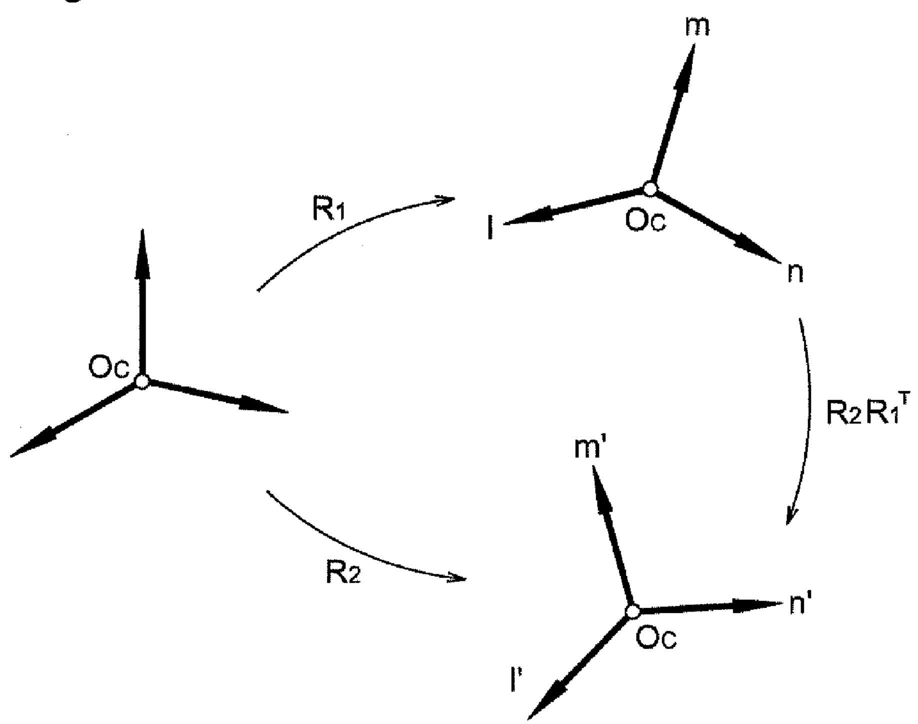
FIG. 14 is an explanatory view illustrating the basic principle relating to camera rotation.

That is to say, as shown in FIG. 14, from the two images before/after rotation relative to the world coordinate system, the rotation vector R of the camera 1 mounted on the vehicle can be obtained. However, in the case of the calibrating apparatus of the invention, the vehicle 90 and the camera 1 are fixed. So, one image is inputted from the camera 1. Moving the vehicle 90 or the camera 1 for obtaining a plurality of images will be undesirable since this will result in longer time required for calibration and will be detrimental to the calibration precision also.

However, the essential principle is that if a rotation matrix of the coordinate system defined by {l', m', n'} is obtained from the coordinate system defined by {l, m, n}, this agrees to the rotation matrix R of the camera 1. That is, for the process, it suffices to obtain {l, m, n} from the coordinate system prior to the rotation and to obtain {l', m', n'} from the coordinate system after the rotation. Therefore, the coordinate system prior to the rotation is conceived as the camera coordinate system (first camera coordinate system) resulting purely from the translation to the optical center Oc of the camera 1 in the world coordinate system. And, the coordinate system after the rotation is conceived as the camera coordinate system (second camera coordinate system) resulting from the rotation of the first camera coordinate system about the optical center Oc of the camera 1.

[First Matrix Calculating Step]

Figure 15:
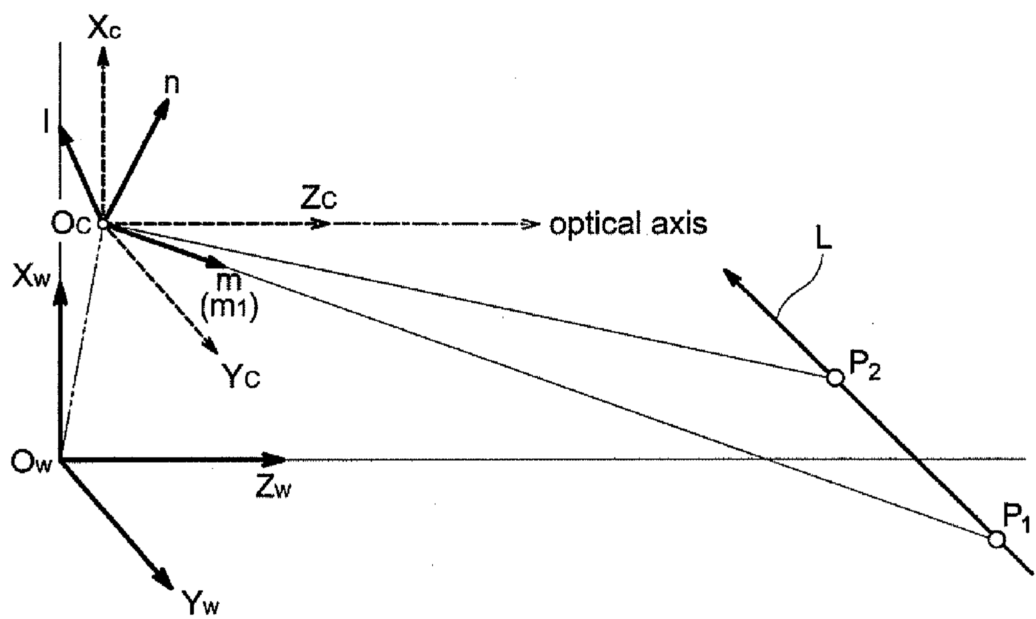
FIG. 15 is an explanatory view showing the N vector constituting the basis for a first matrix.

The first camera coordinate system is the coordinate system resulting purely from the translation relative to the origin Ow of the world coordinate system, free from any rotational component. As shown in FIG. 15, there are obtained N vectors from the optical center Oc to the points $P_1$, $P_2$ representing the calibration points Q of the markers 80. Needless to say, in this first matrix calculating step, the captured image of the camera 1 and various kinds of information obtainable from the captured image are not needed. This step is effected by the first matrix calculating section 13 shown in FIG. 6, but the captured image of the camera 1 is not used in this step.

Figure 18:
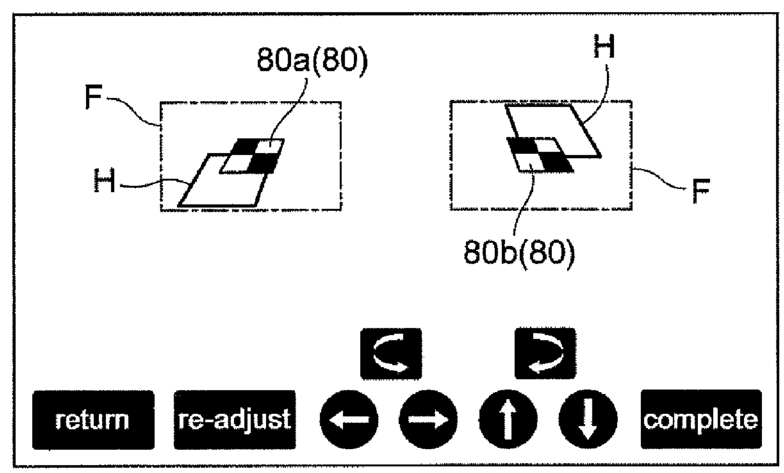
FIG. 18 is a view showing an example of display on the monitor device when camera calibration was not successful.

In the instant embodiment, since the markers 80 are disposed on the floor face, the coordinate values along the $X_W$ axis are substantially zero. However, the coordinate of the point $P_1$ is defined as $(X_1, Y_1, Z_1)$ and the coordinate of the point $P_2$ is defined as $(X_2, Y_2, Z_2)$, respectively. The straight line L is defined as the straight line extending from the point $P_1$ to the point $P_2$. In the direction from the optical center Oc to the point $P_1$, there is an N vector $m_1$. In the direction from the optical center Oc to the point $P_2$, there is an N vector $m_2$. For simplicity of explanation, FIG. 18 shows only the N vector $m_1$. N vector m is presented by the following formula (2). And, the N vector n is a unit normal line vector of the plane $OcP_1P_2$, represented by the following formula (3).

$$m = \frac{\overrightarrow{O_C P_1}}{|\overrightarrow{O_C P_1}|} \tag{2}$$

$$n = \frac{\overrightarrow{O_C P_1} \times \overrightarrow{O_C P_2}}{|\overrightarrow{O_C P_1} \times \overrightarrow{O_C P_2}|} \tag{3}$$

The orientation l of the straight line L is obtained as an outer product of m and n as shown by the following formula (4) and a rotation matrix $R_1$ is obtained by the following formula (5).

$$l = m \times n \tag{4}$$

$$R_1 = (lmn) \tag{5}$$

In this way, based upon the coordinates of the calibration points Q ($P_1$, $P_2$) in the world coordinate system (reference coordinate system), the first matrix calculating section 13 calculates the first matrix $R_1$ representing the vectors relating to the calibration points $P_1$, $P_2$ as viewed from the optical center Oc of the camera and the straight line L passing the calibration points $P_1$, $P_2$.

[Second Matrix Calculating Step]

Figure 16:
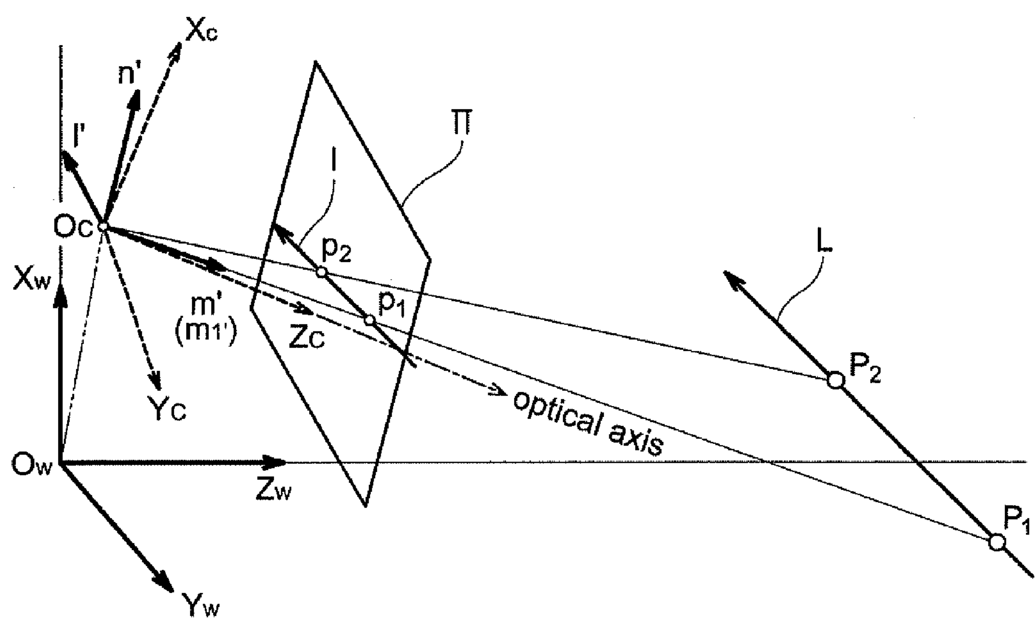
FIG. 16 is an explanatory view showing the N vector constituting the basis for a second matrix.

The second camera coordinate system is the coordinate system resulting from the rotation of the first camera coordinate system about the optical axis Oc, hence, containing rotational component. Unlike the first matrix calculating step described above, the captured image obtained by the camera 1 is used in this step. As shown in FIG. 16, the calibration points Q ($P_1$, $P_2$) on the floor face correspond respectively to the points $p_1$, $p_2$ on the projecting plane Π. The coordinate values of the points $p_1$, $p_2$ on the projecting plane Π have been determined by the calibration pint specifying section 12, as described hereinbefore. Therefor, as shown in FIG. 6, this step is effected by the second matrix calculating section 14, based on the result of the calibration point specifying section 12.

Figure 19:
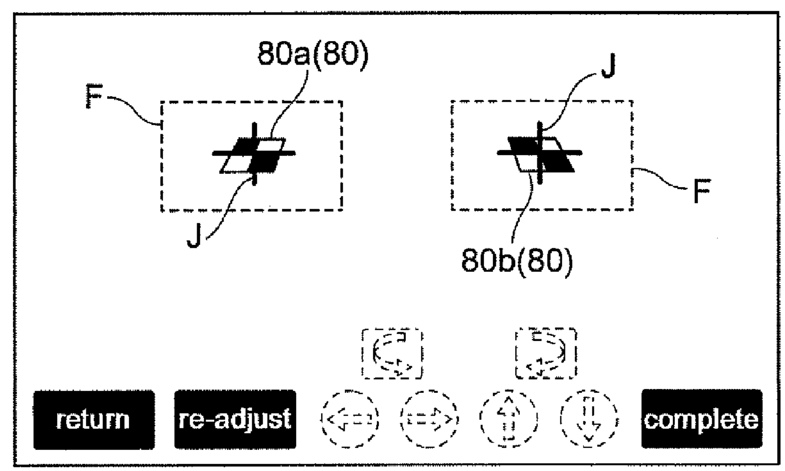
FIG. 19 is a view showing another example of confirmation marker.

Now, the N vectors from the optical center Oc to the points $p_1$ ($x_1$, $y_1$), $p_2$ ($x_2$, $y_2$) on the projecting plane Π are considered. Incidentally, ($x_i$, $y_i$) are coordinates on the projecting plane Π (on the captured image). The straight line l corresponding to the straight line L is defined as the straight line extending from the point $p_1$ to the point $p_2$. In the direction from the optical center Oc to the point $p_1$, there is an N vector $m_1'$. In the direction from the optical center Oc to the point $p_1$, there is an N vector $m_2'$. For simplicity of explanation, FIG. 19 shows only the N vector $m_1'$. N vector m' is presented by the following formula (6). And, the N vector n' is a unit normal line vector of the plane $Ocp_1p_2$, represented by the following formula (7).

$$m' = \frac{\overrightarrow{O_C p_1}}{|\overrightarrow{O_C p_1}|} \tag{6}$$

$$n' = \frac{\overrightarrow{O_C p_1} \times \overrightarrow{O_C p_2}}{|\overrightarrow{O_C p_1} \times \overrightarrow{O_C p_2}|} \tag{7}$$

The orientation l' of the straight line L is obtained as an outer product of m' and n' as shown by the following formula (8) and a rotation matrix $R_2$ is obtained by the following formula (9).

$$l' = m' \times n' \tag{8}$$

$$R_2 = (l' m' n') \tag{9}$$

In this way, based upon the coordinates of the calibration points Q ($p_1$, $p_2$) on the projecting plane Π (captured image) specified by the calibration point specifying section 12, the second matrix calculating section 14 calculates the second matrix $R_2$ representing the vectors relating to the calibration points $p_1$, $p_2$ as viewed from the optical center Oc of the camera and the straight line L passing the calibration points $p_1$, $p_2$.

[Third Matrix Calculating Step]

Based upon the first matrix $R_1$ and the second matrix $R_2$ obtained as described above, the third matrix calculating section 15 calculates the third matrix $R_3$ representing the rotation condition of the camera 1 in the world coordinate system. Namely, like the above-described formula (1), the rotation matrix R is calculated according to the following formula (10).

$$R = R_2 R_1^T = (\, l' \;\; m' \;\; n' \,)\begin{pmatrix} l \\ m \\ n \end{pmatrix} \tag{10}$$

[Rotation Angle Calculating Step]

The camera 1 is a perspective camera model represented by the pinhole camera. A camera matrix of a perspective camera model consists of an interior parameter matrix and an exterior camera matrix of the camera. The interior camera matrix is a parameter matrix inside the camera such as a focal length f, as described hereinbefore. The exterior camera matrix comprises the translation matrix T and the rotation matrix R obtained above. A projective camera model is a generalized representation of the camera matrices of the perspective camera model. With the projective camera model, once the rotation matrix R is obtained, projection from a three-dimensional space is possible. On the other hand, with the perspective camera model, there is a need to decompose the rotation matrix R further into pan, tilt and roll rotation angle components of the respective axes of the three-dimensional orthogonal coordinate system. The rotation angle calculating section 16 calculates the rotation angle of each axis according to the following procedure.

The rotation matrix R obtained by the above formula (10) can be written as follows, where θ is the tilt angle, ϕ is the roll angle and ϕ is the pan angle.

$$R = \begin{pmatrix} r_{11} & r_{12} & r_{13} \\ r_{21} & r_{22} & r_{23} \\ r_{31} & r_{32} & r_{33} \end{pmatrix} = \begin{pmatrix} \cos\phi\cos\theta & \cos\phi\sin\theta\sin\psi - \sin\phi\cos\psi & \cos\phi\sin\theta\cos\psi + \sin\phi\sin\psi \\ \sin\phi\cos\theta & \sin\phi\sin\theta\sin\psi - \cos\phi\cos\psi & \sin\phi\sin\theta\cos\psi - \cos\phi\sin\psi \\ -\sin\theta & \cos\theta\sin\psi & \cos\theta\cos\psi \end{pmatrix} \tag{11}$$

By using the following formula (12), ϕ can be eliminated; thus, the following formula (13) is obtained.

$$r_{11}^2 + r_{21}^2 = (\cos\phi\cos\theta)^2 + (\sin\phi\cos\theta)^2 = \cos^2\theta(\cos^2\phi + \sin^2\phi) = \cos^2\theta \tag{12}$$

$$\cos\theta = \pm\sqrt{r_{11}^2 + r_{21}^2} \tag{13}$$

The formula (13) has two solutions, and since "−r31" is "−sin θ", θ is represented by the following formula (14).

$$\theta = \tan^{-1}\left(\frac{-r_{31}}{\pm\sqrt{r_{11}^2 + r_{21}^2}}\right) \tag{14}$$

Here, if cos θ≠0, then, the roll angle ϕ and the pan angle ϕ are represented by the following formula (15) and formula (16).

$$\phi = \tan^{-1}\left(\frac{\pm r_{21}}{\pm r_{11}}\right) \tag{15}$$

$$\psi = \tan^{-1}\left(\frac{\pm r_{32}}{\pm r_{33}}\right) \tag{16}$$

Here, based upon the mounting method (downward: about 30 [deg]=−30 [deg]) of the camera 1 to the vehicle 90, a restraint condition relating to the tilt angle θ is applied. (formula (17) below).

$$-90° < \theta + 90° \quad (17)$$

With application of this restraint condition, the case of the cos value of tilt angle θ being zero is omitted and the rotation angles θ, ϕ and ϕ can be obtained uniquely. First, with the restraint condition, [cos θ>0], with omission of negative values from consideration, the formula (14) becomes the following formula (18) and the tilt angle θ is now determined.

$$\phi = \tan^{-1}\left(\frac{-r_{31}}{\sqrt{r_{11}^2 + r_{21}^2}}\right) \quad (18)$$

Similarly, since [cos θ>0], the roll angle ϕ and the pan angle ϕ can be obtained easily as shown by the formula (19) and formula (20) below.

$$\phi = \tan^{-1}\left(\frac{r_{21}}{r_{11}}\right) \quad (19)$$

$$\psi = \tan^{-1}\left(\frac{r_{32}}{r_{33}}\right) \quad (20)$$

[Camera Parameter Calculating Step]

As described above, there have been obtained the rotation components relative to the respective axes of the three-dimensional Cartesian coordinate system as the exterior parameters of the camera 1. The translation components (Tx, Ty, Tz) in the exterior parameters are known in the world coordinate system as the coordinate of the optical center Oc. Further, the interior parameters are known as the characteristics of the camera 1. Therefore, the camera parameter calculating section 17 can determine all of the camera parameters (projection parameters) of the camera 1. At this point, the rotation parameter R, one of the exterior parameters, is not yet determined, but only a temporary rotation parameter (undetermined rotation parameter). Therefore, the camera parameters including this temporary rotation parameter are also the temporary camera parameters (undetermined camera parameters).

[Coordinate Conversion Step]

With all the temporary parameters of the camera 1 obtained, the coordinate conversion section 18 converts the three dimensional coordinate values of the calibration points Q ($P_1$, $P_2$) in the world coordinate system into coordinate values on the two-dimensional projecting plane Π. That is to say, the theoretical coordinate values of the calibration points obtained with using the temporary camera parameters (undetermined camera parameters) at the time of completion of the automatic adjustment are calculated as confirmation coordinates.

[Adjustment Completion Confirming Step]

Figure 17:
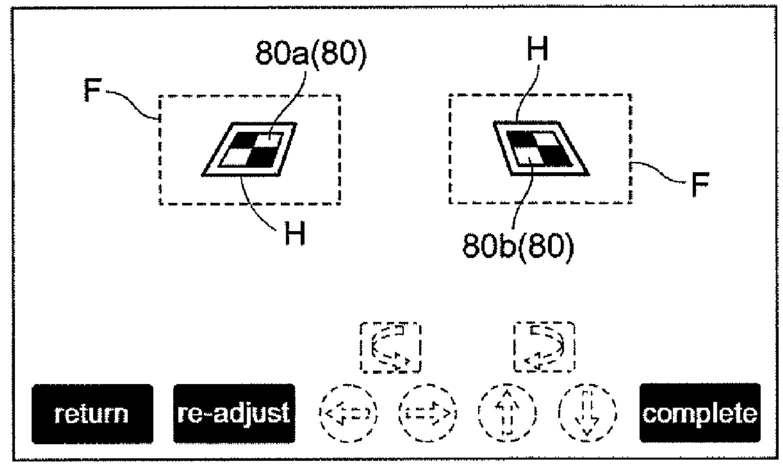
FIG. 17 is a view showing an example of display on the monitor device when camera calibration was successful.

The display controlling section 201 of the HMI controlling section 20, as shown in FIG. 17, causes the displaying section **4*a* of the monitor device 4 to display the marker frames H (confirmation markers) in the form of graphic images in superposition with a captured image, through the image processing module 2. The marker frame H is set at the position where the marker 80 is displayed within this frame, in case the adjustment by the automatic adjusting section 30** has been appropriately completed, that is, the values of the rotation parameters have been correctly calculated.

In the above, according to a preferred arrangement, the theoretical calibration point (confirmation coordinate) obtained by the coordinate conversion section 18 based upon the temporary camera parameters may be the coordinate of the center of the marker frame H. Each side of the marker frame H may be set with a margin of 2 to 5 pixels relative to each corresponding side of the marker 80 in the image coordinate system, when the marker 80 is located at the center of the marker frame H. That is to say, the marker frame H will be sized with a margin (or play) corresponding to the tolerance provided for the rotation parameter R. Preferably, the marker frame H is displayed in a different color than that of the ROI frame F, e.g. red, in order to avoid confusion with the ROI frame F which is displayed in the green color for instance.

Incidentally, in the above, the rectangular marker frame H is used as the confirmation marker. Instead, a cross-shaped marker J as shown in FIG. 19 may be used. In case the confirmation marker is such cross-shaped marker J, as shown in FIG. 19, a cross mark crossing the confirmation coordinate will be graphically rendered. From the ergonomic point of view, it is said that confirming the marker 80 being within the frame is easier than confirming agreement between the cross of the cross-shaped marker J and the intersection point. For this reason, in this embodiment, the marker frame H is used as the confirmation marker. The worker will confirm the screen by viewing and if the worker finds the marker 80 being within the marker frame H, then, the worker will determine that the calibration of the camera 1 has been completed appropriately, so the worker will operate a completion button in the touch panel **4*b*. Operations to the touch panel 4*b* are transmitted via the instruction input receiving section 202 of the HMI controlling section 20 to the automatic adjusting section 30 and the camera parameter setting section 19**.

[Camera Parameter Setting Step]

The above-described operation to the touch panel **4*b* in the adjustment completion confirming step is a determining instruction input for determining the temporary camera adjustment value as a camera adjustment value. Upon receipt of this determining instruction input via the instruction input receiving section 202, the camera parameter setting section 19 sets the temporary parameter (undetermined camera parameter) calculated by the automatic adjusting section 30 and including the rotation parameter R, as the camera parameter. Specifically, as shown in FIG. 3, a camera parameter stored in the parameter memory 7 connected to the CPU 5 is rewritten by the CPU 5. As described above, the parameter memory 7** is comprised of a rewritable, non-volatile memory, or any other memory having a backup power source. Preferably, a flash memory or an $E^2$PROM is used.

The temporary camera parameter is temporarily stored in a work area such as a register of the CPU 5 or a RAM (random access memory). In the camera parameter setting step, the adjusted camera parameter temporarily stored in a work area such as a register or the like is written into the parameter memory 7 and updated, whereby the calibration of the camera 7 is completed, e.g. a calibration operation of the camera 1 in a production factory is completed. With this, all the operations by the calibrating apparatus 10 are completed and the displaying section **4*a* of the monitor device 4 will show e.g. a map screen of the navigation system, like the one shown in FIG. 7**.

[Readjusting Step (Manual Adjusting Step)]

In the adjustment completion confirming step, if the marker 80 is found not within the marker frame H as shown in FIG. 18, the worker will then determine that the calibration of the camera 1 is not completed yet. At this time, the display controlling section 201 displays the marker frame H or the cross-shaped marker J in a different display mode from the mode described above. For instance, the marker frame H or the cross-shaped marker J will be shown with blinking (flashing) or shown with a different displaying color. Further, the display controlling section 201 causes the ROI frame F to be displayed in a different display mode than the mode when the calibration point detecting section 12 detects the calibration point. As described above, since the CPU 5 continues its processing from the calibration point specifying step to the automatic adjusting step without any pause, it is preferred that the ROI (region of interest) frame F provided for the worker's confirmation be displayed continuously during the automatic adjustment step also. Therefore, in case the ROI frame F has been displayed continuously, the display controlling section 201 will change the display mode of this ROI frame F. For instance, the displaying color of the ROI frame F will be changed from green to red or displayed with blinking so as to caution the worker. As the display mode of the ROI frame F which has been displayed continuously is changed, the visibility for the worker can be improved.

The CPU 5 is capable of recognizing the marker 80 being not within the marker frame H, based upon the coordinate values of the theoretical calibration point (confirmation coordinate) obtained by the coordinate conversion section 18. More particularly, the CPU 5 can determine that the result of automatic adjustment is insufficient, when the difference between the actual coordinate and the confirmation coordinate exceeds a predetermined confirmation threshold value. Therefore, the display controlling section 201 can effectively control the display modes of the confirmation marker (marker frame H or the cross-shaped marker J) and the region marker (ROI frame F).

In such case as above, the display controlling section 201 will cause the touch panel 4*b* to display an arrow-shaped button for manual adjustment. Then, the worker will operate this arrow-shaped button in the touch panel 4*b* and proceed to effect readjustment of the camera 1 manually. As described hereinbefore, the coordinate of the center of the marker frame H corresponds to the coordinate of the theoretical calibration point. The worker will operate the arrow-shaped button in the touch panel 4*b* when needed, thereby to adjust the rotation angle or the upper/lower and/or right/left positions on the screen, as described in Patent Document 1 and Patent Document 2, thus effecting manual calibration for placing the marker 80 within the marker frame H. Incidentally, in this manual adjustment, if a line interconnecting two confirmation markers H (J) (i.e. the line interconnecting the confirmation coordinates) is displayed, further improvement in the work efficiency can be expected. The CPU 5, like Patent Document 1 and Patent Document 2, corrects the camera parameters calculated by the automatic adjusting section 30, according to the amount of touch button operation displayed on the touch panel 4*b*. The corrected camera parameter is the temporary camera parameter (undetermined camera parameter).

In the instant embodiment, as the confirmation marker, the marker frame H is employed. As described hereinbefore, from the ergonomic point of view, it is said that confirming the marker 80 being within the frame is easier than confirming agreement between the cross of the cross-shaped marker J and the intersection point. Therefore, in effecting such manual adjustment also, using the marker frame H permits achievement of higher work efficiency. In the instant embodiment, the marker frame H (confirmation marker) is provided as a frame sized to include the marker 80 (calibration marker) with a predetermined margin in the captured image. And, as also described hereinbefore, the marker 80 has a rectangular shape and the marker frame H too is rectangular. Therefore, in both the adjustment completion confirming step and the readjusting step (manual adjusting step), comparison can be made effectively and easily between the outer shape of the marker 80 and the outer frame displayed as the marker frame H.

[Camera Parameter Setting Step]

Finding the marker 80 being confined within the marker frame H, the worker will operate the completion button on the touch panel 4*b*. Operations to the touch panel 4*b* are transmitted via the instruction input receiving section 202 of the HMI controlling section 20 to the automatic adjusting section 30 and/or the manual adjusting section 60 and/or the camera parameter setting section 19. And, the temporary camera parameter after the completion of the manual adjustment is written into the parameter memory 7, thus completing all the processing of the calibrating apparatus 10. And, the displaying section 4*a* of the monitor device 4 will display a map screen of the navigation system, like the one shown in FIG. 7.

[Special Cases of Adjustment Completion Confirming Step and Camera Parameter Setting Step]

Incidentally, in the above-described adjustment completion confirming step, even when the difference between the confirmation coordinate and the actual coordinate is below the predetermined determination threshold value, the display controlling section 201 can sometimes change the display mode of the confirmation marker (marker frame H or the cross-shaped marker J) or the region frame (ROI frame F). Namely, in case the camera parameter at the time of completion of the automatic adjustment has a same value as the initial value of the camera parameter, regardless of the result of the decision based on the determination threshold value, the display controlling section 201 causes the region frame F to be displayed in a different display mode than that of the region frame F indicating the region of interest ROI in the case of the detection of the calibration point by the calibration point detecting section 12. Further, the display controlling section 201 may cause the confirmation marker H (J) to be displayed in a different display mode.

For instance, preferably, the display controlling section 201 changes the display mode of the confirmation marker H (J) or the region frame F, if the rotation parameter R in the case of the camera 1 being mounted at the designed position and under the designed posture has a same value as the temporary rotation parameter R at the time of completion of the calculations by the automatic adjusting section 30. In this case, the display mode of the confirmation marker or the region frame may be changed, regardless of the result of decision based on the confirmation threshold value, if any one of the pan, tilt and roll components contained in the rotation parameter R has the same value.

Errors in the rotation parameter R will show normal distribution like natural phenomena in general. However, the median value thereof is different from that of the ideal rotation parameter R. As the possibility of all parts that may cause errors in the rotation parameter become the ideal designed values is extremely low, the possibility of the median value of the normal distribution being the ideal rotation parameter R is rare. Further, it may be reasoned that the median value of the normal distribution relates to the frequency of the posture of the on-board camera 1 when this camera is mounted on the vehicle 90. The posture corresponding to the ideal rotation parameter R is the designed posture, not the most frequently produced posture in the production. Therefore, it may be also said that the chance of the initial value as the ideal rotation parameter R being same as the temporary rotation parameter R at the time of completion of automatic adjustment is rare.

In such rare case of the rotation parameter R at the time of completion of automatic adjustment having a same value as the initial value, this may be taken as indicating the rotation parameter R remaining unchanged from the initial value due to failure of appropriate implementation of calibration calculation. Therefore, in such case, like the readjusting step, the display controlling section 201 will change the display mode of the confirmation marker (marker frame H or the cross-shaped marker J) or the region frame (ROI frame F), i.e. caution the worker.

Further, the camera parameter setting section 19 will record in its work log the fact that the camera parameter was written in the parameter memory 7 under such condition as above. For instance, the record will be transmitted via the CAN 50 to a production management computer, etc. Or, the record will be stored in e.g. a diagnosis memory or the like provided in the parking assisting ECU 9. That is, the fact that the parameter memory 7 is not un-calibrated to remain under the initial condition, but has been rewritten the same value as the initial value as the result of calibration is kept in record. With this, when a displacement of the optical axis of the camera 1 is found later, it is possible to determine whether this displacement occurred post-production or due to production defect.

OTHER EMBODIMENTS (1) In the foregoing embodiment, the calibrating apparatus 10 is activated when a worker operates the system setting button **4*h* of the monitor device 4 to cause the displaying section 4*a* to display the setting screen and then operates a predetermined touch button on the touch panel 4*b*. Further, in the foregoing embodiment, the calibrating apparatus 10 basically effects automatic adjustment and in the confirming step, if necessary, the worker effects manual adjustment. However, the system may differ for each production or repair factory and the automatic adjustment may not always be possible in all production/repair factories. Then, preferably, as shown in FIG. 20, an arrangement may be provided such that at the time of activation (start) of the calibrating apparatus 10**, selection between automatic adjustment and manual adjustment is made possible.

As described above, at a production/repair factory, a worker operates the system setting button **4*h* shown in FIG. 7 to cause the displaying section 4*a* to display the setting screen. In this displaying section 4*a*, as shown in the upper section in FIG. 20, there is shown a geographical map together with the present position of the vehicle 90. Then, in response to the above operation, there will be displayed a setting screen (first setting screen) as shown in the intermediate section in FIG. 20. Then, if the worker selects a "camera adjustment" button in the touch panel 4*b*, the instruction input receiving section 202 of the HMI controlling section 20 receives this touch button instruction and the CPU 5** activates the camera calibration program. To this point, this further embodiment is same as the foregoing embodiment and the above-described automatic adjustment calculations are effected in this further embodiment as well.

Figure 20:
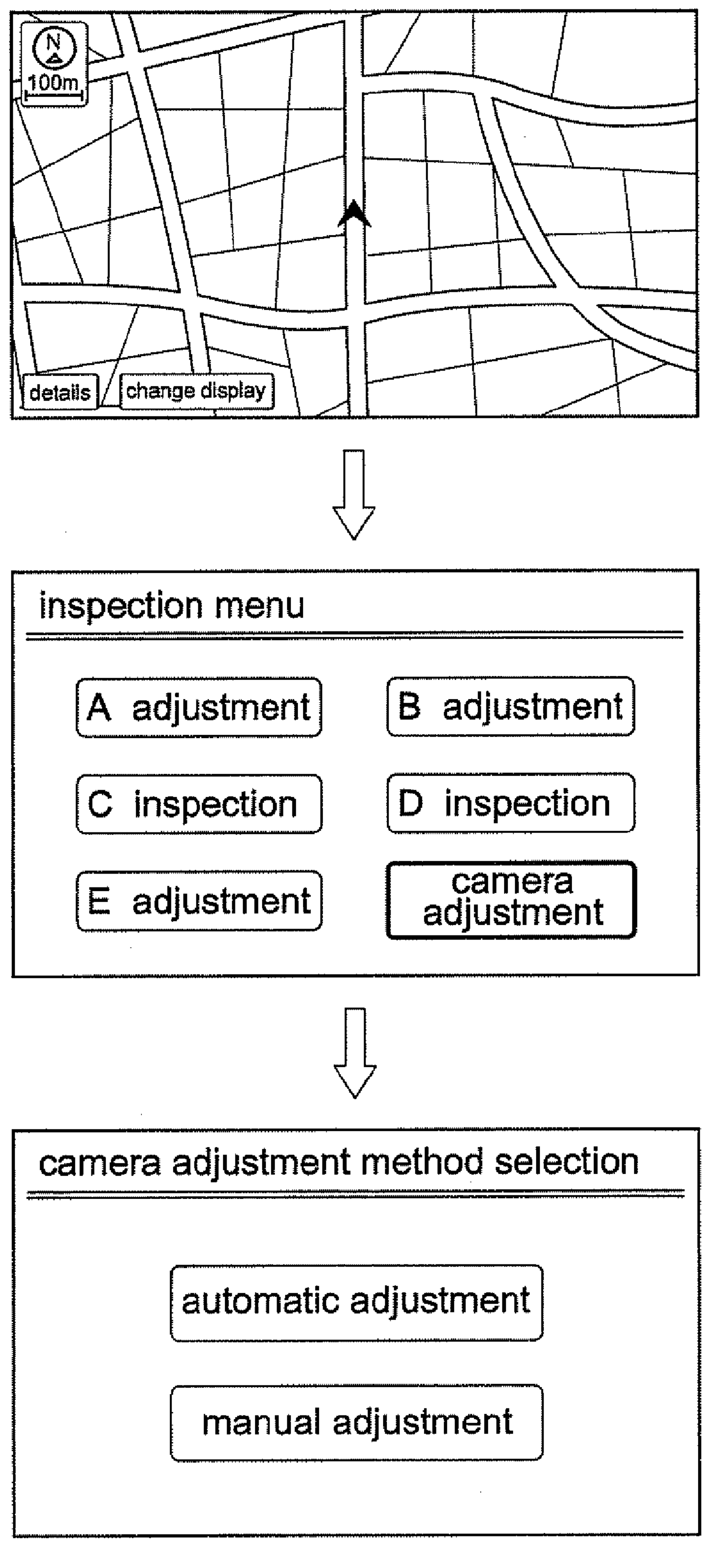
FIG. 20 is a view showing an example of display on a displaying section at the time of start-up of the calibrating apparatus.

In this further embodiment, as shown in the lower section in FIG. 20, a selection screen is displayed. And, at this stage, if the worker selects the "automatic adjustment" button in the touch panel **4*b*, the instruction input receiving section 202 of the HMI controlling section 20 receives this touch button instruction and the CPU 5 activates the automatic calibration program. This automatic calibration program is same as the camera calibration program described in the foregoing embodiment. In the selection screen, if the worker selects a "manual adjustment" button in the touch panel 4*b*, the instruction input receiving section 202 of the HMI controlling section 20 receives this touch button instruction and the CPU 5** activates the manual calibration program. In response to this selection of manual calibration program, a camera calibration program which executes manual adjustment calculations similar to those in Patent Document 1 and Patent Document 2 is activated.

(2) The setting of the region of interest ROI and the superposing of this ROI frame F in the displaying section **4*a*** are possible, regardless of the camera calibration method. Namely, these are possible, not only in the case of manual adjustment, but also in the case of effecting the camera calibration by a calculation technique different from the one described in the foregoing embodiment. Further, the use of the rectangular marker frame H as the confirmation marker is possible, regardless of the camera calibration method. Namely, this is possible, not only in the case of manual adjustment, but also in the case of effecting the camera calibration by a calculation technique different from the one described in the foregoing embodiment.

(3) Further, in the foregoing embodiment, there was described the case of using two markers 80. Instead, three or more markers 80 may be used for further improvement of precision. Also, in the foregoing embodiment, there was described the case of calibrating the camera 1 configured to capture an image rearwardly of the vehicle 90. The calibrating apparatus of the invention may be used also for calibration of a camera configured to capture an image forwardly or laterally of the vehicle 90.

(4) In the foregoing embodiment, no adjustments are made for the interior parameters of the camera or the translation parameter included in the exterior parameters, but the adjustment is made only for the rotation parameter included in the exterior parameters. However, the present invention is applicable also for calibrating the camera, by adjustment of the camera parameters including the interior parameter and the translation parameter. Further, the calibration of the camera is not limited to the one obtaining the interior parameters or the exterior parameters as they are. The invention is applicable also to camera calibration that calibrates a camera by obtaining an adjustment parameter for adjusting a difference if any between a theoretical parameter and an actual parameter, or a correction parameter for correcting the theoretical parameter to the actual parameter.

As described above, preferably, the confirmation marker is sized to accommodate the calibration marker in the captured image with a predetermined margin. From the ergonomic point of view, it is said that confirming a target being at a center of a frame or the like is easier than confirming agreement between a confirmation marker in the form of a cross marker and a calibration point. It is also said that from the ergonomic point of view, placing a target at the center of a frame or enclosure is easier than aligning a point with another point. Therefore, providing the confirmation marker in the form of a frame will achieve improvement not only in the visibility, but also in work efficiency at the time of manual adjustment. Then, in the case of the inventive calibrating apparatus, the outer frame of the calibration marker can be advantageously used as a "target" in the manual adjustment. As the outer shape of the frame is known, by displaying the appropriate confirmation marker accommodating the calibration marker in the captured image with a predetermined margin, even higher work efficiency can be ensured. Since the outer shape of the frame of the calibration marker on the captured image may contain a distortion depending on the mounted posture of the on-board camera, a confirmation marker having a similar shape to the outer shape that can be distorted or deformed in the captured image should be displayed, with taking this into consideration. For instance, in the case of a calibration marker having a rectangular outer shape, preferably, a calibration marker having a similar shape to the outer shape of the calibration marker which forms an approximate parallelogram on the capture image can be displayed advantageously. Further, in the case of a calibration marker having a circular outer shape, preferably, a calibration marker having a similar shape to the calibration marker that forms an oval shape on the captured image can be displayed advantageously.

As described above, according to the present invention, it has been made possible to provide a calibrating apparatus for an on-board camera of a vehicle, which apparatus allows completion of calibration process with a simple additional calibration, even when rejection has issued on the result of automatic calibration. And, according to the present invention, it has been made possible to provide a calibrating apparatus for an on-board camera of a vehicle, which apparatus allows speedy, yet reliable decision of acceptance/rejection of calibration result, with a simple apparatus construction, without being affected by the calibration environment. That is to say, with the present invention, it has become possible to realize rationally semi-automatic calibration including visual confirmation by a worker during execution of automatic calibration, rather than completely automatic calibration, whereby the time period required for the calibration operation can be reduced and at the same time, with confirmation, mixing of a defect product into the products for shipping can be avoided. Further, in case the calibration by the automatic adjustment proves insufficient, the calibration can be further continued with manual adjustment. Hence, the possibility of the product being inadvertently eliminated as a defect product from the production line can be reduced, so that the productivity can be improved.

The invention claimed is:

1. A calibrating apparatus for an on-board camera of a vehicle, comprising:

an image acquiring section for acquiring a captured image captured by the camera including, within a field of view, calibration markers arranged at a plurality of predetermined differing positions;

a calibration point specifying section for specifying each calibration point in each one of the calibration markers in the captured image;

an automatic adjusting section for effecting automatic adjustment of a camera parameter of the on-board camera, with using the specified calibration point;

a display controlling section for causing a displaying section to display a confirmation marker in the form of a graphic image in superposition with the captured image, the confirmation marker being configured to specify, in the captured image, a position of theoretical coordinate of the calibration point calculated with using the camera parameter at the time of completion of the automatic adjustment;

an instruction input receiving section for receiving an instruction capable of moving the confirmation marker in a screen displayed at the displaying section;

a manual adjusting section for effecting manual adjustment on the automatically adjusted camera parameter, based on a displacement amount of the theoretical coordinate of the calibration point corresponding to a movement amount of the confirmation marker; and a camera parameter setting section for setting an undetermined camera parameter which is the camera parameter at the time of completion of most recent adjustment by the automatic adjusting section and the manual adjusting section, as said camera parameter, in response to a determination instruction received by the instruction input receiving section.

2. The on-board camera calibrating apparatus according to claim 1, wherein the confirmation marker comprises a confirmation marker sized to accommodate the calibration marker in the captured image with a predetermined margin.

* * * * *